(12) United States Patent
Pafumi et al.

(10) Patent No.: US 8,533,164 B2
(45) Date of Patent: Sep. 10, 2013

(54) METHOD AND TOOL TO OVERCOME VIOS CONFIGURATION VALIDATION AND RESTORATION FAILURE DUE TO DRC NAME MISMATCH

(75) Inventors: James A. Pafumi, Leander, TX (US); Rupesh Kumar Thota, Bangalore (IN); Chintamani Praksh Siddeshwar, Karwar (IN); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 12/963,958

(22) Filed: Dec. 9, 2010

(65) Prior Publication Data

US 2012/0150816 A1 Jun. 14, 2012

(51) Int. Cl.
*G06F 7/00* (2006.01)

(52) U.S. Cl.
USPC ............................................. 707/679; 709/213

(58) Field of Classification Search
USPC ............................ 707/640, 679, 674, 737, 831
See application file for complete search history.

(56) References Cited

U.S. PATENT DOCUMENTS

| | | | |
|---|---|---|---|
| 7,346,801 B2 | 3/2008 | Brunelle | |
| 7,363,535 B2 | 4/2008 | Taguchi | |
| 7,434,104 B1 * | 10/2008 | Skeoch et al. | 714/38.11 |
| 7,478,220 B2 | 1/2009 | Forrer, Jr. | |
| 7,865,782 B2 * | 1/2011 | Terashima et al. | 714/43 |
| 2004/0153711 A1 | 8/2004 | Brunelle | |
| 2007/0283350 A1 * | 12/2007 | Anderson et al. | 718/100 |
| 2009/0150510 A1 * | 6/2009 | Kovacs et al. | 709/213 |
| 2010/0083251 A1 * | 4/2010 | McCrory et al. | 718/1 |
| 2011/0131576 A1 * | 6/2011 | Ikegaya et al. | 718/1 |
| 2011/0289342 A1 * | 11/2011 | Schaefer et al. | 714/4.1 |

* cited by examiner

*Primary Examiner* — Pierre Vital
*Assistant Examiner* — Sabana Rahman
(74) *Attorney, Agent, or Firm* — Yudell Isidore Ng Russell PLLC

(57) ABSTRACT

In a Virtual Input/Output (I/O) Server (VIOS) partition, a method comprises a cluster aware (CA) operating system (OS) of a VIOS partition performing the functions of: responsive to a restore command: retrieving a configuration backup file from storage; comparing a DRC name from the retrieved file with a DRC name of the current VIOS partition performing the restore operation; in response to an occurrence of a DRC name mismatch: retrieving an initial UUID of the VIOS from the configuration backup file; accessing a UUID table within a management tool; locating a matching UUID to the initial UUID within the UUID table; and in response to locating the matching UUID: verifying that the configuration data file belongs to the current VIOS initiating the restore operation; and performing the restore operation to restore the configurations of the hardware, logical and virtual devices of the first VIOS to an earlier configuration state.

18 Claims, 10 Drawing Sheets

METHOD AND TOOL TO OVERCOME VIOS CONFIGURATION VALIDATION AND RESTORATION FAILURE DUE TO DRC NAME MISMATCH

BACKGROUND

1. Technical Field

The present invention relates in general to distributed data processing systems and in particular to distributed data processing systems with cluster-aware virtual input/output servers (VIOSes). Still more particularly, the present invention relates to a method, data processing system and computer program product for overcoming failure of a VIOS restore operation due to a name mismatch.

2. Description of the Related Art

Virtualized data processing system configuration, which provides the virtualization of processor, memory and Operating System (OS) resources are becoming more and more common in the computer (and particularly the computer server) industry. To a lesser extent, storage virtualization is also known and provided in limited environments. Within a storage virtualization environment, one or more virtual input/output servers (VIOSes) can be provided for handling I/O operations of the virtualized client logical partitions (LPARs). Currently, backup and restoration processes performed on such systems are manually driven and very time consuming and directed to the client LPARs. Further, errors encountered during a restore operation can lead to a failure of the entire restoration.

BRIEF SUMMARY

Disclosed are a method, data processing system, and a computer program product that enable completion of a restore operation of a Virtual Input/Output (I/O) Server (VIOS) partition when a DRC name mismatch error occurs during the restore operation. In a first VIOS partition, the method provides a cluster aware (CA) operating system (OS) executing on a processor resource within the first VIOS partition to perform the functions of: responsive to receipt of a VIOS restore command: retrieving the configuration backup file from the local storage; comparing a DRC name retrieved from the retrieved configuration backup file with a current DRC name associated with the VIOS partition in which the OS instance is executing; and in response to an occurrence of a DRC name mismatch: retrieving an initial UUID of the VIOS from within the configuration backup file; accessing a UUID table within a management tool; locating a matching UUID to the initial UUID within the UUID table; and in further response to locating the matching UUID: verifying that the configuration data file belongs to the VIOS in which the restore operation is being initiated; and performing the restore operation, wherein the restore operation includes restoring the configuration of the hardware, logical and virtual devices of the first VIOS to a state that existed at a time at which a backup operation that created the configuration backup file was performed. When no matching UUID is found within the UUID table, the method generates a failure notification.

According to one embodiment, the method further comprises: performing, via a backup/restore utility of a cluster aware (CA) operating system (OS) executing on a processor resource of the first VIOS partition, a backup operation on the first VIOS partition, which creates a configuration backup file having configuration information about the hardware, logical and virtual devices of the VIOS partition; including within the backup file a universally unique identifier (UUID) of the OS instance within the first VIOS partition for which the backup file is being created; tagging the configuration backup file with a DRC name identifying a current network location of the first VIOS partition; and storing the configuration backup file within a storage.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein.

DETAILED DESCRIPTION

Figure 1A:
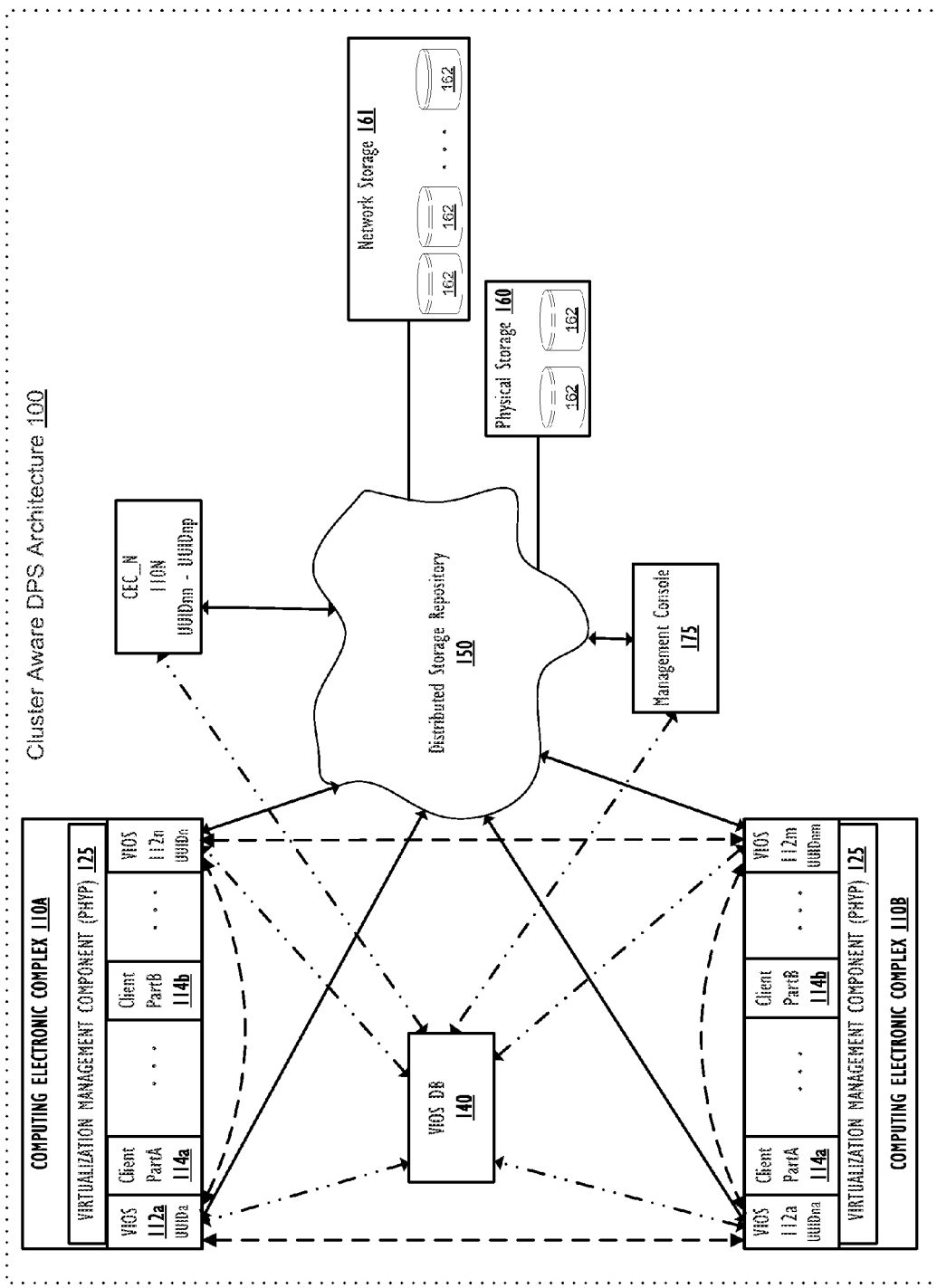
FIG. 1A illustrates a first view of a cluster (aware) data processing system within which various of the functional features of the described embodiments are implemented, according to one embodiment.

The illustrative embodiments provide a method, data processing system, and a computer program product that enable completion of a restore operation of a Virtual Input/Output (I/O) Server (VIOS) partition when a DRC name mismatch error occurs during the restore operation. In a first VIOS partition, the method provides a cluster aware (CA) operating system (OS) of a VIOS partition performing the functions of: responsive to a restore command: retrieving a configuration backup file from storage; comparing a DRC name from the retrieved file with a DRC name of the current VIOS partition performing the restore operation; in response to an occurrence of a DRC name mismatch: retrieving an initial UUID of the VIOS from the configuration backup file; accessing a UUID table within a management tool; locating a matching UUID to the initial UUID within the UUID table; and in response to locating the matching UUID: verifying that the configuration data file belongs to the current VIOS initiating the restore operation; and performing the restore operation to restore the configurations of the hardware, logical and virtual devices of the first VIOS to an earlier configuration state.

According to one embodiment, the method further comprises: performing, via a backup/restore utility of a cluster aware (CA) operating system (OS) executing on a processor resource of the first VIOS partition, a backup operation on the first VIOS partition, which creates a configuration backup file having configuration information about the hardware, logical and virtual devices of the VIOS partition; including within the backup file a universally unique identifier (UUID) of the OS instance within the first VIOS partition for which the backup file is being created; tagging the configuration backup file with a DRC name identifying a current network location of the first VIOS partition; and storing the configuration backup file within a storage.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized. For example, as utilized herein, the term cluster-aware refers to the operational state of each VIOS within the cluster where the VIOSes contain information about which other VIOSes are connected within the cluster, the configuration of the different CECs within the DPS supported by the cluster, information about which client LPARs are supported by each VIOS, and other state and operating information and data related to performing VIO operations using the physical I/O devices of the DPS and those of the distributed storage repository (storage repository). Cluster awareness is supported by both a shared, networked VIOS database and locally maintained copies of VIOS cluster data within each VIOS. Further, as presented herein the DRC name of a VIOS partition represents a unique location code, which uniquely identifies the VIOS partition at its address path within the overall cluster network. Thus, a given DRC name of (or associated with) a first VIOS partition in CEC A would be different from any DRC name of another/second VIOS partition within the same CEC or another CEC in the overall DPS. The DRC name can, in one embodiment comprise the following concatenation of values:

Serial Number: Machine Number: PCIA bus: Slot

Additionally, in other embodiments, different combinations of values may be utilized to generate the unique DRC name of the VIOS. The DRC name can further identify a particular resource in the VIOS and/or the particular CEC and particular location within the CEC of the VIOS partition. Thus, the DRC identifies the network location or address of the VIOS (or resources within the VIOS), and the same VIOS (configuration) can be assigned a different DRC when the VIOS is migrated to another CEC or moved to a different DRC (location) within the same CEC. Finally, the universally unique identifier (UUID) assigned to each VIOS partition and the unique Client identifiers (UCID) assigned to each client LPAR are understood to respectively enable complete differentiation between any one VIOS partition from the other VIOS partitions within the VIOS cluster and for any client LPAR from another client LPAR within a CEC (or the DPS).

As further described below, implementation of the functional features of the invention is provided within processing devices/structures and involves use of a combination of hardware, firmware, as well as several software-level constructs (e.g., program code). The presented figures illustrate both hardware components and software components within example data processing architecture having a specific number of processing nodes (e.g., computing electronic complexes). The illustrative and described embodiments assume that the system architecture may be scaled to a much larger number of processing nodes.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa. The following sequence of headings and subheadings are presented within the specification:

A. General Architecture
B. Cluster-Aware VIOS
C. VIOS Shared DB for Cluster Management D. VIOS Backup and Restore with DRC Name Mismatch
  D1. Backup of VIOS Partition Configuration With Initial DRC Name and UUID
  D2. Validation and Restore of VIOS Partition With DRC Name Mismatch A. General Architecture With specific reference now to FIG. 1A, there is depicted a block diagram of an example cluster-aware (CA), distributed data processing system (DPS) architecture 100, within which the functional aspects of the described embodiments may advantageously be implemented. For simplicity, cluster-aware, distributed DPS architecture 100 shall be referred to herein simply as DPS 100. DPS 100 comprises a plurality of computing nodes, each referred to herein as a computing electronic complex (CEC), of which CECs 110A and 110B are illustrated. The number of CECs within DPS 100 may vary, ranging from a single CEC in a smaller system extending up to hundreds or thousands of CECs, in larger scaled systems. For simplicity, the embodiments shall be described from the perspective of a single CEC (CEC 110A) or two CECs (CECs 110A, 110B). Each CEC 110A-110B comprises at least one (and in most instances a plurality of) Virtual Input/Output Server 112 (also referred to herein as a VIO Server or VIOS), with functionality as described below. The actual number of VIOSes 112 within each CEC 110 of DPS 100 is a design feature and may vary. As shown, each VIOS 112 has a universally unique identifier (UUID) associated with the particular VIOS. Thus, no two VIOSes within the entire DPS 100 has a same UUID, and each new VIOS added to the DPS 100 is provided with a new UUID. While presented with some sense of a sequence of allocation within FIG. 1A, in one or more embodiments, the UUIDs of VIOSes within a same CEC 110 are not necessarily sequential to or associated with each other or to the CEC, and a system wide UUID allocation scheme may be implemented that results in a non-sequential allocation across VIOSes within multiple CECs 110. Also supported within each CEC 110A-110B are client logical partitions (interchangeably referred to as client LPARs or "clients"), of which a first two clients, clientA 114a and clientB 114b, are illustrated. As described below, with reference to FIG. 2, client LPARs 114 are logical partitions of a virtualized (or operating system partitioned) computing system. The actual number of clients within each CEC 110 may vary and could range from a single client to hundreds or thousands of clients, without limitation. For efficiency in presenting the inventive concepts herein, only two clients are presented within each CEC 110 of the various illustrative and described embodiments.

DPS 100 also comprises a distributed storage facility, accessible to each of the CECs 110 and the components within the CECs 110. Within the described embodiments, the distributed storage facility will be referred to as distributed storage repository 150, and the distributed storage repository 150 enables several of the client level functional features provided by the embodiments described herein. Distributed storage repository 150 provides a single view of storage that is utilized by each CEC 110 and for each client 114 of each CEC 110 within a cluster-aware, distributed system. Distributed storage repository 150 comprises local physical storage 160 and network storage 161, both of which comprise multiple physical storage units 162 (e.g., disks, solid state drives, etc.). The physical disks making up distributed storage repository 150 may be distributed across a storage network (e.g., a SAN). Additionally, distributed storage repository 150 provides a depository within which is stored and maintained the software utility, instruction code, OS images, client images, data (system, node, and client level), and/or other functional information utilized in maintaining the client-level, system management, and storage-level operations/features of DPS 100. In addition to distributed storage repository 150, DPS 100 also comprises a VIOS database (DB) 140, which may also be a distributed storage facility comprising physical disks across a storage network. VIOS DB (or DB) 140 is a repository that stores and provides access to various cluster configuration data and other functional components/modules and data structures that enable the various cluster-aware functionality described herein. In one embodiment, portions of distributed storage repository 150 may be allocated to provide storage pools for a cluster. Each VIOS 112 of the cluster maintains a local view of the DB 140 and updates the cluster level information/data/data structures within DB 140 as such information/data is created or updated.

Communication between each VIOS 112 of each CEC 110 as well as with the VIOSes of at least one other CEC 110 is generally supported via a plurality of inter-CEC interconnects, illustrated as bi-directional, dashed lines connecting pairs of VIOSes 112. The arrows indicated two way data exchange or communication between components. In addition to the inter-CEC interconnects, each VIOS 112 is also connected to distributed storage repository 150 via VIOS-to-Store or CEC-to-Store interconnects, which are also illustrated as full lined bi-directional arrows. Also, each VIOS 112 is connected to DB 140 via VIOS-to-DB interconnects, presented as dashed and dotted lines. With the exception of the inter-CEC connectors running from a first VIOS (e.g., VIOS 112a) of a first CEC to a second VIOS (e.g., VIOS 112b) on the same CEC, the various interconnects represent a network level connectivity between the VIOS nodes of the cluster and the DB 140 and the distributed storage repository 150. As utilized herein, references to one or more "nodes", are assumed to refer specifically to a VIOS within the cluster. DPS 100 also comprises a management console 175 on which a management tool (not shown) executes.

Figure 1B:
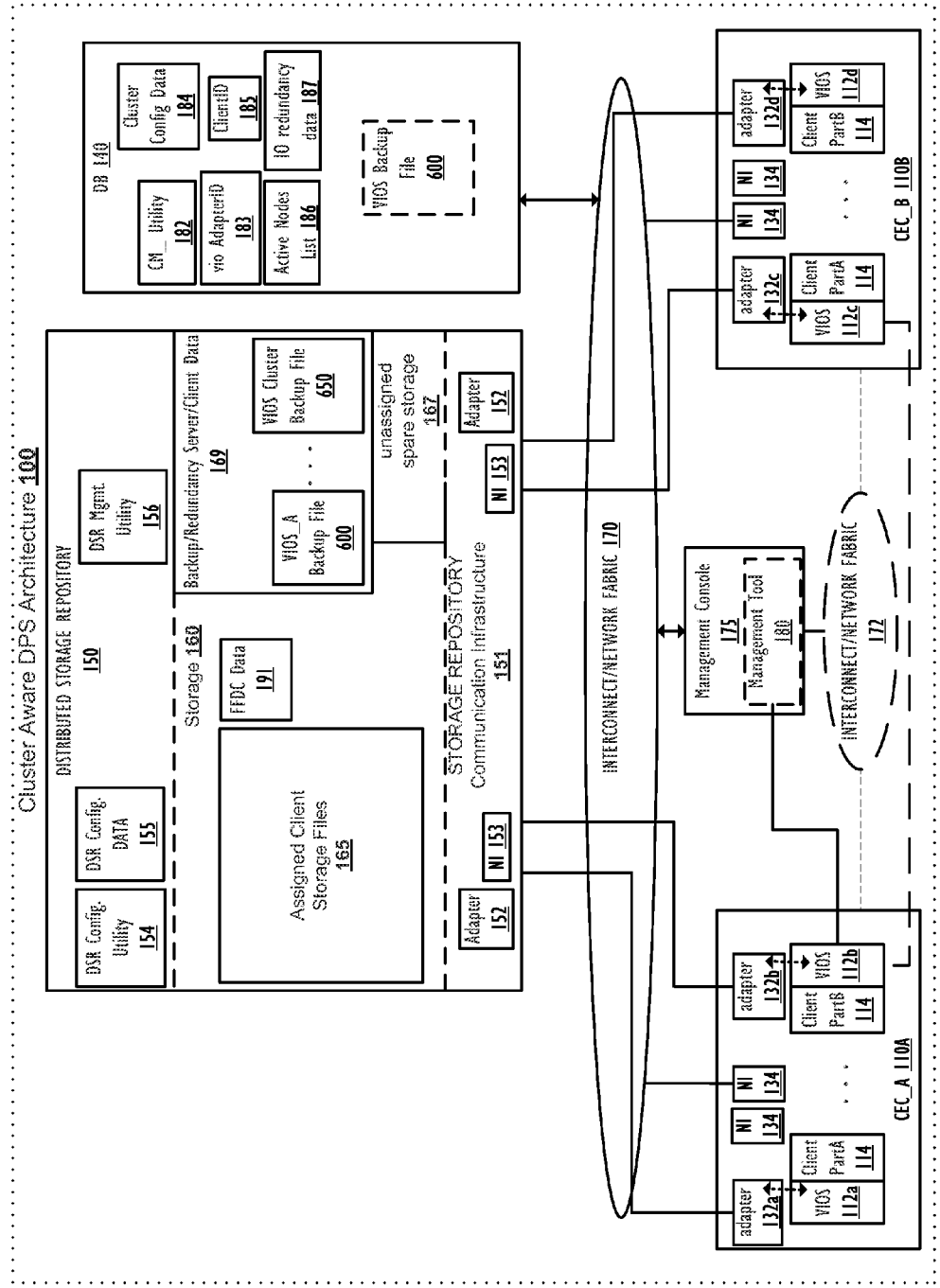
FIG. 1B illustrates a second view of the cluster data processing system (DPS) of FIG. 1A depicting additional functional components within the computing complexes and shared storage, according to one embodiment.

Turning now to FIG. 1B, there is illustrated another view of DPS 100 illustrating the network-based connection of the CECs 110 to the distributed storage repository 150 and DB 140. FIG. 1B illustrates in greater detail the network connectivity of VIOSes and CECs to each other and to Distributed storage repository 150. With this view, CEC_A (Node_A) 110A and CEC_B (Node_B) 110B comprise similar constructs as presented in FIG. 1A. Each CEC 110 within DPS 100 connects to distributed storage repository 150 via one or more networks and/or I/O interconnect/switch fabric (generally illustrated as interconnect/network fabric 170). The descriptions and illustrations assume that at least some of the CECs 110 of DPS 100 and distributed storage repository 150 are located remotely from each other, including being located in different countries, for example, such that no direct physical connectivity exists between the respective devices. For simplicity, the embodiments are described as having primary interconnect/network 170 comprising a private wide area network (WAN) or a public WAN (such as the Internet), although other network types (e.g., a local area network) are possible and supported.

As depicted, in one or more embodiments, each CEC 110 is also connected to one or more neighbor CECs 110, in order to provide efficient fail-over and/or mobility support and other functions, as described hereinafter. As utilized herein, the term neighbor refers to a connected second CEC with which a first CEC is able to communicate, and references to a neighbor CEC is not limited to a second CEC in geographic proximity to the first CEC. CEC_A 110A and CEC_B 110B are illustrated connected to each other via some connecting medium, which may include a different network (such as a local area network) 172 or some type of direct interconnect (e.g., a fiber channel connection) when physically close to each other. The connection between neighbor CECs 110A and 110B is illustrated as a direct line connection or a secondary network connection (172) between CECs 110A and 110B. However, it is appreciated that the connections are not necessarily direct, and may actually be routed through the same general interconnect/network 170 as with the other CEC connections to distributed storage repository 150. In one or more alternate embodiments, the connections between CECs may be via a different network (e.g., network 172, FIG. 1B), such as a local area network (LAN).

Figure 1C:
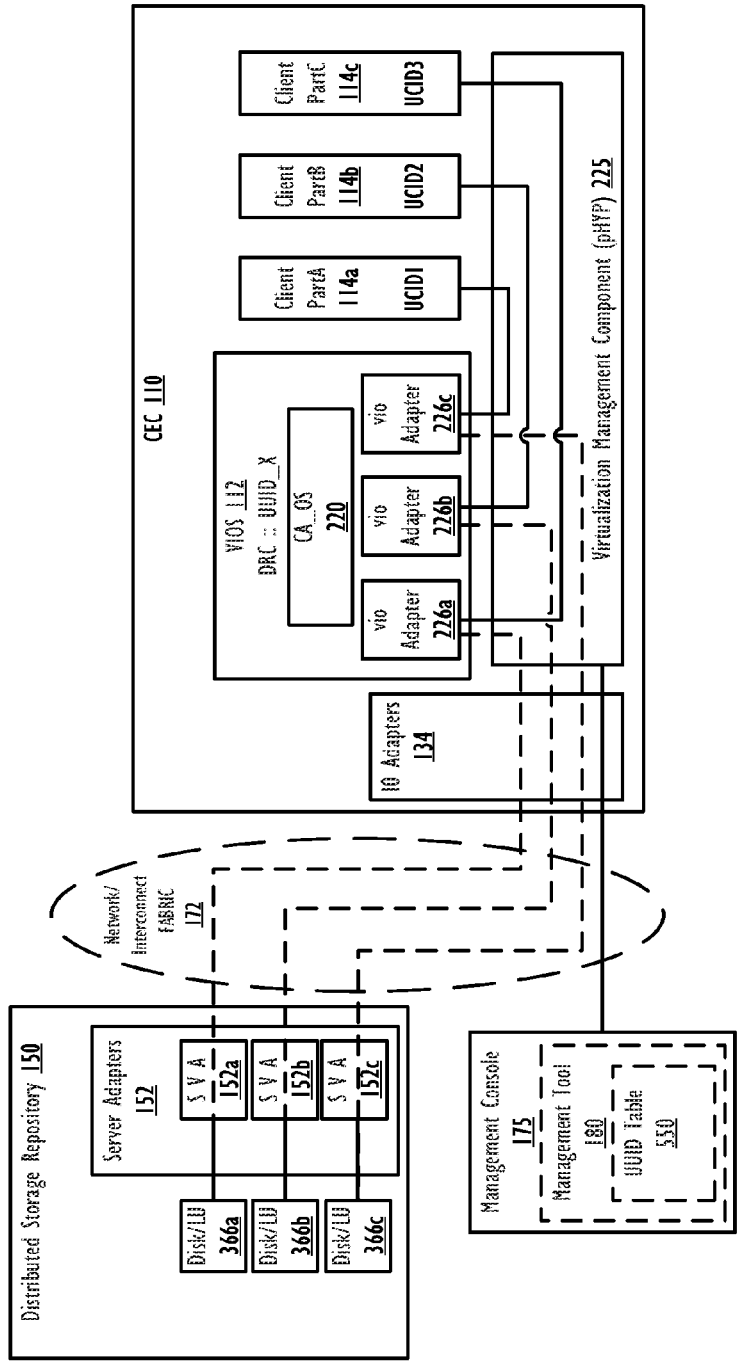
FIG. 1C illustrates a third view of the cluster data processing system (DPS) of FIG. 1A depicting virtual IO connectivity from client logical partitions (LPARs) to assigned client logical units or disks, according to one or more embodiments.

As depicted, each CEC 110 comprises one or more network interfaces 134 and one or more I/O adapters 132 to enable the CEC 110 and thus the other components (i.e., client partitions) of the CEC 110 to engage in network level communication, as illustrated by FIG. 1C. As illustrated within FIG. 1C, within an example virtual I/O architecture 190, each VIOS 112 emulates virtual client I/O adapters 226a-22c to enable communication by specifically-assigned client LPARs 114a-114c with distributed storage repository 150 and/or VIOS DB 140 and/or other clients, within the same CEC or on a different CEC. The VIOSes 112 emulate these virtual I/O adapters 226a-226c and communicates with distributed storage repository 150 by connecting with corresponding virtual sever I/O adapters (SVA) 152a-152c at distributed storage repository 150. In various embodiments, these pairings of virtual client I/O adapters with specific SVAs are unique for each client LPAR 114 to enable each client LPAR 114 to have secure access to the specific storage location (366) assigned to that client LAPR 114. Internal CEC communication between VIOS 112 and client LPARs 114a-114c are illustrated with solid connecting lines, which are routed through the virtualization management component, while VIOS to server communication is provided by dashed lines, which connect via the network/interconnect fabric 172. The VIOSes 112 within each CEC 110 are thus able to support client level access to distributed storage 150 and enable the exchange of system level and client level information with distributed storage repository 150. Each client LPAR 114 has a unique client identifier (UCID). Also, each VIOS 112 has a specific DRC identifying the network location or address of the VIOS (or resources within the VIOS 112). Additionally, each VIOS has a universally unique identifier (UUID), which is associated with that particular VIOS configuration. Also shown by FIG. 1C is the connection of the management console 175, which is utilized to perform the setup and/or initialization of the backup and restore operations described herein for the individual VIOSes 112 and/or for the OS cluster as a whole, in various embodiments. Included within management console 175 and as utilized in the described embodiments, is management tool 180, which has access to and/or a copy of VIOS UUID Table 550.

In addition, each VIOS 112 also comprises the functional components/modules and data to enable the VIOSes 112 within DPS 100 to be aware of the other VIOSes anywhere within the cluster (DPS 100). From this perspective, the VIOSes 112 are referred to herein as cluster-aware, and their interconnected structure within DPS 100 thus enables DPS 100 to also be interchangeably referred to as cluster-aware DPS 100. As a part of being cluster-aware, each VIOS 112 also connects to DB 140 via network 170 and communicates cluster-level data with DB 140 to support the cluster management functions described herein.

Also illustrated by FIG. 1B is an initial view of the component make-up of an example distributed storage repository 150 and an initial listing of some components of DB 140. To support the virtual I/O operations with the VIOSes 112 and the associated virtual client I/O adapters, distributed storage repository 150 comprises communication infrastructure 151. Communication infrastructure 151 comprises network interface(s) 153 and a plurality of server I/O adapters 152 utilized for cluster-level communication and enabling access to data/code/software utility stored on distributed storage repository 150 to complete I/O operations thereto. Specifically, these server I/O adapters are also presented as virtual sever I/O adapters 152a-c (see FIG. 1C), which are paired with respective virtual I/O adapters 226a-c (via emulation of physical I/O adapters 132) that are assigned to specific clients 114a-114c of CECs 110.

Figure 3:
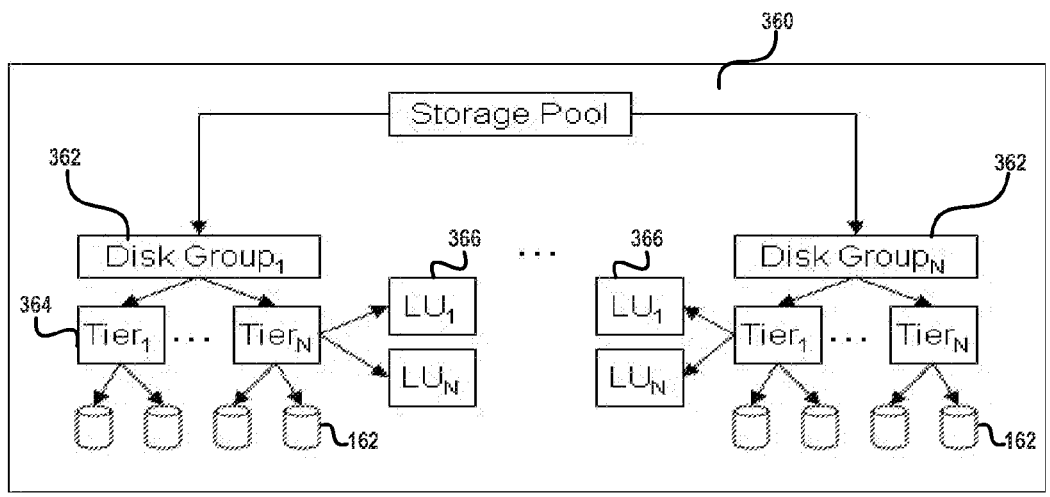
FIG. 3 illustrates an example shared storage pool utilized for storage I/O functions of the VIOSes, according to one embodiment.

As shown, distributed data store 150 generally comprises general storage space 160 (the available local and network storage capacity that may be divided into storage pools) providing assigned client storage 165 (which may be divided into respective storage pools for a group of clients), unassigned, spare storage 167, and backup/redundant CEC/VIOS/client configuration data storage 169. In one embodiment, the assigned client storage is allocated as storage pools, and several of the features related to the sharing of a storage resource, providing secure access to the shared storage, and enabling cluster-level control of the storage among the VIOSes within a cluster are supported with the use of storage pools. When implemented within a VIOS cluster, storage pools provide a method of logically organizing one or more physical volumes for use by the clients supported by the VIOSes making up the VIOS cluster. FIG. 3 illustrates an example configuration of a storage pool utilized within a cluster aware DPS 100. Specifically, FIG. 4A provides details on how these physical volumes are used within the storage pool. As shown, storage pool 360 within the cluster contains one or more Disk Groups 362. Disks Groups 362 provide administrators the ability to provide access policies to a given subset of physical volumes 162 within the storage pool 360. Once a disk group 362 has been defined, administrators can further categorize the subset into Storage Tiers 364 based on disk characteristics. Once a Disk Group 362 and Storage Tier 364 have been defined, administrators carve Logical Units (LU) 366 to be exported to client partitions (114).

With the capability of virtual pooling provided herein, an administrator allocates storage for a pool and deploys multiple VIOSes from that single storage pool. With this implementation, the storage area network (SAN) administration functions is decoupled from the system administration functions, and the system administrator can service customers (specifically clients 114 of customers) or add an additional VIOS if a VIOS is needed to provide data storage service for customers. The storage pool may also be accessible across the cluster, allowing the administrator to manage VIOS work loads by moving the workload to different hardware when necessary. With the cluster aware VIOS implementation of storage pools, additional functionality is provided to enable the VIOSes to control access to various storage pools, such that each client/customer data/information is secure from access by other clients/customers. One such functionality is the allocation to each client LPAR of individual virtual I/O (VIO) adapters having unique adapter identifiers (AdapterID), as presented in the descriptions of the embodiments herein.

Returning now to FIG. 1B, located within backup/redundancy data storage 169 of distributed storage repository (DSR) 150 are one or more VIOS backup files 600 and VIOS Cluster backup file 650. Specific functionality of these two types of backup files and the method by which both file types are created, as well as how the files are utilized to support the restore of one or more VIOSes and/or the VIOS cluster is provided (or described) in greater detail in Section D of the present disclosure. In an alternate embodiment, one or both of the VIOS backup file/s 600 and VIOS cluster backup file 650 can be stored within VIOS DB 140. Regardless of the implementation, both storage locations (190 or 140) are accessible to management tool 180 and enable access by system administrative tools/personnel to the backup file data as needed for completing subsequent restore operations.

As illustrated, DSR 150 further comprises a plurality of software, firmware and/or software utility components, including DSR configuration utility 154, DSR configuration data 155 (e.g., inodes for basic file system access, metadata, authentication and other processes), and DSR management utility 156.

To support the cluster awareness features of the DPS 100, and in accordance with the illustrative embodiment, DPS 100 also comprises VIOS database (DB) 140, in which is stored various data structures generated during set up and/or subsequent processing of the VIOS cluster-connected processing components (e.g., VIOSes and management tool). VIOS DB 140 comprises a plurality of software or firmware components and/or and data, data modules or data structures, several of which are presented in FIG. 1B, for illustration. Among these components are cluster management (CM) utility 182, VIO AdapterID data structure 183, cluster configuration data 184, Client identifying (ID) data 185, active nodes list 186, and I/O redundancy data 187, among others. Also included is a copy of VIOS backup file 650, in the illustrative embodiment. These various components support the various clustering functionality and cluster-aware I/O operations of the one or more VIOSes 112, as described herein. Additional features of DB 140 and distributed storage repository 150 as well as the specific components or sub-components that enable the various clustering functionality are presented within the description of the remaining figures and throughout the description of the various presented embodiments.

The various data structures illustrated by the figures and/or described herein are created, maintained and/or updated, and/or deleted by one or more operations of one or more of the processing components/modules described herein. In one embodiment, the initial set up of the storage pools, VIOS DB 140 and corresponding data structures is activated by execution of a management tool 180 to roll out the installation and activation of a plurality of cluster aware operating systems by and/or on one or more VIOSes 112. Once the infrastructure has been established, however, maintenance of the infrastructure, including expanding the number of nodes, where required, is performed by the VIOSes 112 in communication with DB 140 and the management tool 180.

Also associated with DPS 100 and communicatively coupled to distributed storage repository 150 and DB 140 and VIOSes 112 is management console 175, which may be utilized by an administrator of DPS 100 (or of distributed storage repository 150 or DB 140) to access DB 140 or distributed storage repository 150 and configure resources and functionality of DB 140 and of distributed storage repository 150 for access/usage by the VIOSes 112 and clients 114 of the connected CECs 110 within the cluster. As shown in FIG. 1B and described throughout the specification, management tool 180 is implemented within management console 175. However, it is appreciated that (resources of) any node within DPS 100 may be selected/elected to perform the functions of management tool 180, and the selected node would then be utilized to activate/initiate, assist with and/or perform one or more of the below described cluster creation, monitoring and management functions, including backup and restore functions utilizing the availability of the resources provided by DB 140 and distributed storage repository 150.

In an alternate embodiment, management tool 180 is an executable module that is executed within a client partition at one of the CECs within DPS 100. In one embodiment, the management tool 180 controls some of the operations of the cluster and enables each node within the cluster to maintain current/updated information regarding the cluster, including providing notification of any changes made to one or more of the nodes within the cluster. In one embodiment, management tool 180 registers with a single VIOS 112b and is thus able to retrieve/receive cluster-level data from VIOS, including FFDC data (191) of the entire cluster. In one implementation, the management tool 180 the VIOS with which the management tool 180 registers is a primary node of the cluster. In the embodiments detailed herein, management tool 180 supports the completion of a VIOS backup operation and a restore operation of one or more VIOS, including a restore following a failure or disaster condition of one or more VIOSes, as defined in greater details in Section D below.

Figure 2:
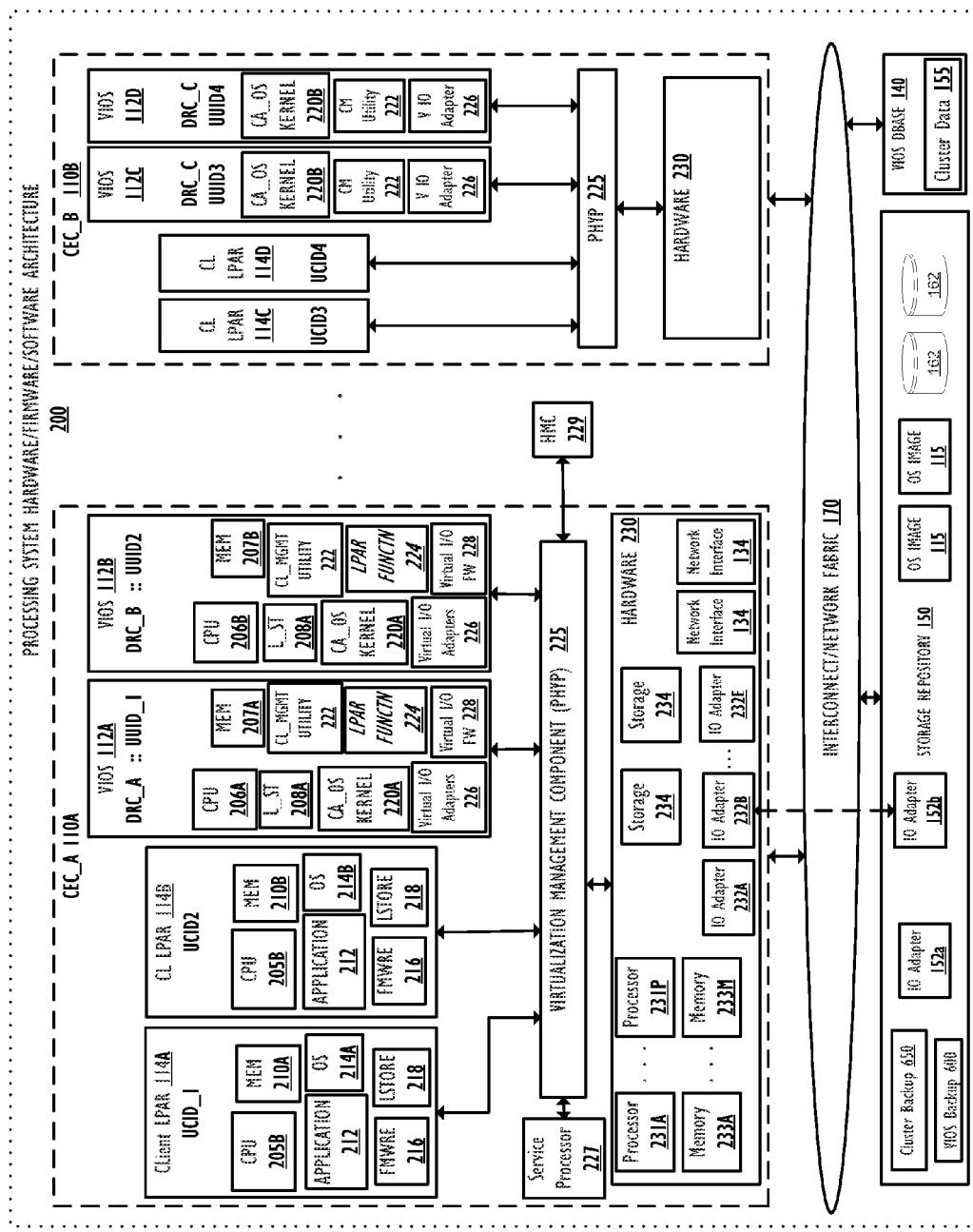
FIG. 2 illustrates an internal configuration of a computing electronic complex (CEC) within the cluster DPS having virtualized OS partitions, including virtual I/O server (VIOS) partitions with functional components that enable cluster awareness, according to one embodiment.

With reference now to FIG. 2, there is presented a third view of an example DPS 100, emphasizing a processing system architecture 200 (i.e., architecture of the individual CECs, and specifically CEC_A 110A). CEC_A 110A (CEC 110A) serves as the example CEC that is described in greater detail in FIG. 2 and throughout the specification. CEC 110A is presented as a server that comprises hardware components and software/firmware/OS components that are logically partition to create a plurality of virtualized machine partitions, which are assigned as client logical partitions (LPARs) and virtual I/O servers (VIOSes). Hardware components 230 of example CEC 110A comprises one or more processors 231A-231P, one or more memories 233A-233M, and local storage 234. The processors 230A-230P are interconnected with one or a plurality of memories 233A-233M and with local storage 234 via a bus, interconnect/switch or an interconnect fabric (not specifically shown). The specific internal connectivity of components, which may be distributed across a large scale interconnect fabric, is not germane to the described embodiments, and no further detail is presented regarding the particular type of interconnectivity between the system hardware components.

Also included within hardware components 230 are one or more physical network interfaces 134 by which CEC_A 110A connects to an external network, such as network 170, among others. Additionally, hardware components 230 comprise a plurality of I/O adapters 232A-232E, which provides the I/O interface for CEC_A 110A. I/O adapters 232A-232E are physical adapters that enable CEC_A 110 to support I/O operations via an I/O interface with both locally connected and remotely (networked) connected I/O devices, including SF storage 150. Examples of I/O adapters include Peripheral Component Interface (PCI), PCI-X, or PCI Express Adapter, and Small Computer System Interconnect (SCSI) adapters, among others. CEC 110 is logically partitioned such that different I/O adapters 232 are virtualized and the virtual I/O adapters may then be uniquely assigned to different logical partitions. In one or more embodiments, configuration data related to the virtualized adapters and other components that are assigned to the VIOSes (or the clients supported by the specific VIOS) are maintained within each VIOS and may be maintained and updated by the VIOS OS, as changes are made to such configurations and as adapters are added and/or removed and/or assigned.

Logically located above the hardware level (230) is a virtualization management component, provided as a Power Hypervisor (PHYP) 225 (trademark of IBM Corporation), as one embodiment. While illustrated and described throughout the various embodiments as PHYP 225, it is fully appreciated that other types of virtualization management components may be utilized and are equally applicable to the implementation of the various embodiments. PHYP 225 has an associated service processor 227 coupled thereto within CEC 110. Service processor 227 may be used to provide various services for one or more logical partitions. PHYP 225 is also coupled to hardware management controller (HMC) 229, which exists outside of the physical CEC 110. HMC 229 is one possible implementation of the management console 175 illustrated by FIGS. 1A-1C, and the use of HMC 229 specifically within this illustration is solely for illustration of one actual embodiment among several available options. Operations of the different logical partitions may be controlled through HMC 229, which is a separate data processing system from which a system administrator may perform various functions, such as reallocation of resources to different logical partitions. Importantly, features related to backup and restoration of OS partitions and in particular of the VIOSes and the VIOS cluster are controlled through the HMC, in the present embodiment, but those features are described more generally with reference to the management console 175 in the various other embodiments presented herein.

CEC_A 110A further comprises a plurality of user-level logical partitions (LPARs), of which a first two are shown, represented as individual client LPARs 114A-114B within CEC 110A. According to the various illustrative embodiments, CEC 110A supports multiple clients and other functional operating OS partitions that are "created" within a virtualized environment. Each LPAR, e.g., client LPAR 114A, receives an allocation of specific virtualized hardware and OS resources, including virtualized CPU 205A, Memory 210A, OS 214A, local firmware 216 and local storage (LStore) 218. Each client LPAR 114 includes a respective host operating system 214 that controls low-level access to hardware layer (230) of CEC 110A and/or to virtualized I/O functions and/or services provided through VIOSes 112. Also, each client LPAR is assigned a UCID to uniquely identify that specific client LPAR 114. In one embodiment, the operating system(s) may be implemented using OS/400, which is designed to interface with a partition management firmware, such as PHYP 225, and is available from International Business Machines Corporation. It is appreciated that other types of operating systems (such as Advanced Interactive Executive (AIX) operating system, a trademark of IBM Corporation, Microsoft Windows®, a trademark of Microsoft Corp, or GNU®/Linux®, registered trademarks of the Free Software Foundation and The Linux Mark Institute) for example, may be utilized, depending on a particular implementation, and OS/400 is used only as an example.

Additionally, according to the illustrative embodiment, CEC 110A also comprises one or more VIOSes, of which two, VIOS 112A and 112B, are illustrated. In one embodiment, each VIOS 112 is configured within one of the memories 233A-233M and comprises virtualized versions of hardware components, including CPU 206, memory 207, local storage 208 and I/O adapters 226, among others. According to one embodiment, each VIOS 112 is implemented as a logical partition (LPAR) that owns specific network and disk (I/O) adapters. Each VIOS 112 also represents a single purpose, dedicated LPAR. The VIOS 112 facilitates the sharing of physical I/O resources between client logical partitions. Each VIOS 112 allows other OS LPARs (which may be referred to as VIO Clients, or as Clients 114) to utilize the physical resources of the VIOS 112 via a pair of virtual adapters. Thus, VIOS 112 provides virtual small computer system interface (SCSI) target and shared network adapter capability to client LPARs 114 within CEC 110. As provided herein, VIOS 112 supports virtual real memory and virtual shared storage functionality (with access to distributed storage repository 150) as well as clustering functionality. Relevant VIOS data and cluster level data are stored within local storage (L_ST) 208 of each VIOS 112. For example, in one embodiment VIOS configuration data of the local VIOS hardware, virtual and logical components. Additionally, and as illustrated within FIG. 4, local storage (L_ST) 208 comprises cluster configuration data 184, cluster state data 185, active nodes list 186. Other illustrative features and/or functionality of VIOS are provided by FIG. 4, which is described below.

Within CEC 110A, VIOSes 112 and client LPARs 114 utilize an internal virtual network to communicate. This communication is implemented by API calls to the memory of the PHYP 225. The VIOS 112 then bridges the virtual network to the physical (I/O) adapter to allow the client LPARs 114 to communicate externally. The client LPARs 114 are thus able to be connected and inter-operate fully in a VLAN environment.

Those of ordinary skill in the art will appreciate that the hardware, firmware/software utility, and software components and basic configuration thereof depicted in FIGS. 1A, 1B, 1C and 2 may vary. The illustrative components of DPS 100 and specifically those within CEC 110A are not intended to be exhaustive, but rather are representative to highlight some of the components that are utilized to implement certain of the described embodiments. For example, different configurations of data processing systems/CECs devices may be provided, containing other devices/components, which may be used in addition to or in place of the hardware depicted, and may be differently configured. The depicted example is not meant to imply architectural or other limitations with respect to the presently described embodiments and/or the general invention. The CEC 110 depicted in the various figures may be, for example, an IBM eServer pSeries system, a product of International Business Machines Corporation in Armonk, N.Y., running the Advanced Interactive Executive (AIX) operating system or LINUX operating system.

B. Cluster-Aware VIOS

Certain of the features associated with the implementation of a cluster aware VIOS (e.g., VIOS 112 of FIGS. 1A, 1B, 1C and 2) are introduced above with reference to the description of the previous figures, and particularly FIG. 2. Descriptions of the specific functionality of the VIOS 112 will continue to be provided with reference to the illustrations of FIGS. 1A, 1B, 1C and 2. As presented by FIG. 2, each VIOS 112 is a virtual machine instance that emulates hardware in a virtualized environment. The VIOS 112 is tasked with emulating SCSI storage devices, and the VIOS 112 provides client LPARs 114 with access to distributed storage repository 150 in cooperation with the PHYP 225. Configuration of the VIOS 112 is performed through the hardware management tools (e.g., management tool 180) of HMC 229 (or more generally management console 175). SCSI storage devices support a set of commands that allow SCSI initiators the ability to control access to storage (150). Database programs, for example, may manage access to distributed storage repository 150 through a set of SCSI commands commonly referred to as persistent reserve. Other types of reserves are also supported by VIOS 112, and the collective group of such commands is referred to herein as reserve commands.

As provided herein, each VIOS 112 allows sharing of physical I/O resources between client LPARs, including sharing of virtual Small Computer Systems Interface (SCSI) and virtual networking. These I/O resources may be presented as internal or external SCSI or SCSI with RAID adapters or via Fibre-Channel adapters to distributed storage repository 150. The client LPAR 114, however, uses the virtual SCSI device drivers. In one embodiment, the VIOS 112 also provides disk virtualization for the client LPAR by creating a corresponding file on distributed storage repository 150 for each virtual disk. The VIOS 112 allows more efficient utilization of physical resources through sharing between client LPARs, and supports a single machine (e.g., CEC 110) to run multiple operating system (OS) images concurrently and isolated from each other.

In one or more embodiments, the VIOS operating system(s) is an enhanced OS that includes cluster-aware functionality and is thus referred to as a cluster aware OS (CA_OS). One embodiment, for example, utilizes cluster aware AIX (CAA) as the operating system. According to one embodiment, cluster-awareness enables multiple independent physical systems to be operated and managed as a single system. With reference now to both FIG. 2 and FIG. 4, which provides an expanded view of functional components/modules within example VIOS 112. As provided within VIOS 112 of CEC 110A, VIOS 112 comprises cluster aware (CA) OS kernel 220 (or simply CA_OS 220), as well as LPAR function code 224 for performing OS kernel related functions for the VIOS LPARs 114. When executed within two or more nodes of DPS, CA_OS 220 enables various clustering functions, such as forming a cluster, adding members to a cluster, and removing members from a cluster, as described in greater detail below. CA_OS 220 manages the VIOS LPARs 112 and enables the VIOS, when executing within a cluster, to be cluster aware. CA_OS 220 comprises several functional modules. In one or more embodiments, CA_OS 220 can comprise cluster management (CM) utility 222, which supports the configuration of the VIOS to enable cluster-awareness and cluster-level functionality, such as redundant virtual I/O. Each of the additional software components/modules of CA_OS 220 that are directly associated with cluster level functions of the CA_OS 220 can be presented as a functional module within CM utility, in one embodiment, and each module may thus be described as being associated with or a component within CM utility 222 throughout the remainder of this specification. In one embodiment, CM utility 222 may be a separate utility that is locally installed or downloaded (from DB 140, for example) as an enhancement to an existing OS within a CEC 110 or VIOS 112, when the VIOS 112 is initially being configured for operation within a VIOS cluster. CM utility 222 is then executed when configuring the individual VIOS to create or join a cluster and/or become a cluster-aware node within the VIOS cluster. With this implementation methodology, CM utility 222 executes within VIOS 112 and enables the OS to support the various cluster-awareness and other cluster-level features and functionality. In an alternate embodiment, CA_OS 220 includes all the clustering features and functionality and establishes the various clustering functions/features when the VIOS 112 joins the cluster and/or during configuration of VIOS 112 to become cluster-aware.

In one implementation, functional components of CM utility 222 are encoded on local device storage (L_Store 208) of a corresponding VIOS 112, and these components are automatically executed on VIOS start up or initiation such that the VIOS 112 becomes automatically configured as a part of the VIOS cluster when the VIOS 112 is initially activated. On initial set up of the VIOS, VIOS API, kernel extensions and virtual adapters are configured within VIOS to enable communication with the other VIOSes, the VIOS DB 140, and with the distributed storage repository 150. During this initial setup of the VIOS 112, the VIOS 112 executes a registration module of CM utility 222 to register VIOS 112 with the cluster. The registration module enables VIOS 112 to retrieve/download or have forwarded from DB 140 (on successful registration with the cluster) any additional CM software components and/or cluster-level information and/or data required to establish full cluster awareness when the VIOS has completed installation and is activated within the CEC 110. Thus, in one embodiment, in addition to the locally stored CA_OS components and software modules of CM utility 222, other functional components of CM utility 222 may be downloaded from DB 140 when CEC is powered on or when one or more VIOSes 112 are enabled on CEC 110. Once the VIOS 112 has completed its setup, one or more client LPARs 114 that are activated within CEC 110 may be assigned to VIOS 112, and VIOS 112 subsequently performs the various I/O operations initiated by the client 114 (as initiator) or directed to the client 114 (as target). Updates to the local VIOS data may periodically be made as changes are made within the VIOS cluster and/or as one or more new client LPARs 114 are added to the CEC 110 requiring VIOS support. In one or more embodiments, CM utility 222 can also enable retrieval and presentation of a comprehensive view of the resources of the entire cluster. Specifically, in one or more of the embodiments described CM utility 222 can retrieve from cluster DB 140 all relevant configuration data for each other VIOS within the cluster as well as the cluster configuration data stored within cluster DB and CM utility 222 can pull that data to the local VIOS storage during execution of a cluster level backup operation, which is described in greater detail in Section D below. In one or more embodiments, CM utility 222 can also enable/support completion of a restore of the VIOS cluster when appropriately triggered to do so by a command received from the management console 175. Within these embodiments, functionality described for CM utility 222 may be performed by a separate backup/restore utility 450 of CA_OS 220. Specifically, with backup/restore utility 450 restore of a VIOS following a disaster can be allowed to complete even when the DRC name from within the configuration backup file does not match the name of the VIOS device(s), in one or more embodiments. With this embodiment, additional functionality of the management tool 180 is accessed to enable the recovery of the VIOS, either at the same/original CEC or in a different location.

In one embodiment, VIOS functionality is enhanced to enable assigning of client identifiers (ID) and unique virtual I/O adapter IDs in a secure manner, while enabling storage pooling within virtual storage (within distributed storage repository 150). According to the described implementation, the different clientID-vioAdapterID pairings are unique throughout the cluster, so that no two clients throughout the entire cluster can share a same virtual adapter and no two vioAdapterIDs are the same within a single client.

Returning now to the figures as further presented by the illustrative embodiments (i.e., FIGS. 2 and 4, with emphasis on FIG. 4), VIOS 112 includes one or more additional functional modules/components, such as VIO adapter(s) 226, and virtual I/O drivers/utility 228, which provides I/O functionality to VIOS 112 and enables VIOS 112 to route data traffic to and from data structures and storage within distributed storage repository 150 and/or DB 140. Virtual I/O adapter(s) 226 and CM utility 222 also enable the VIOS 112 to provide each client LPAR 114 with access to the full range of storage accessible within distributed storage repository 150 and other cluster-supported functionalities, as described herein. VIOS also includes UUID 400.

In the illustrative embodiment, CA_OS kernel 220 comprises three layers of software stack, OS kernel software stack 302, storage virtualization software stack 304, VIOS clustering software stack 306. The VIOS software stack 306 provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS).

Figure 4:
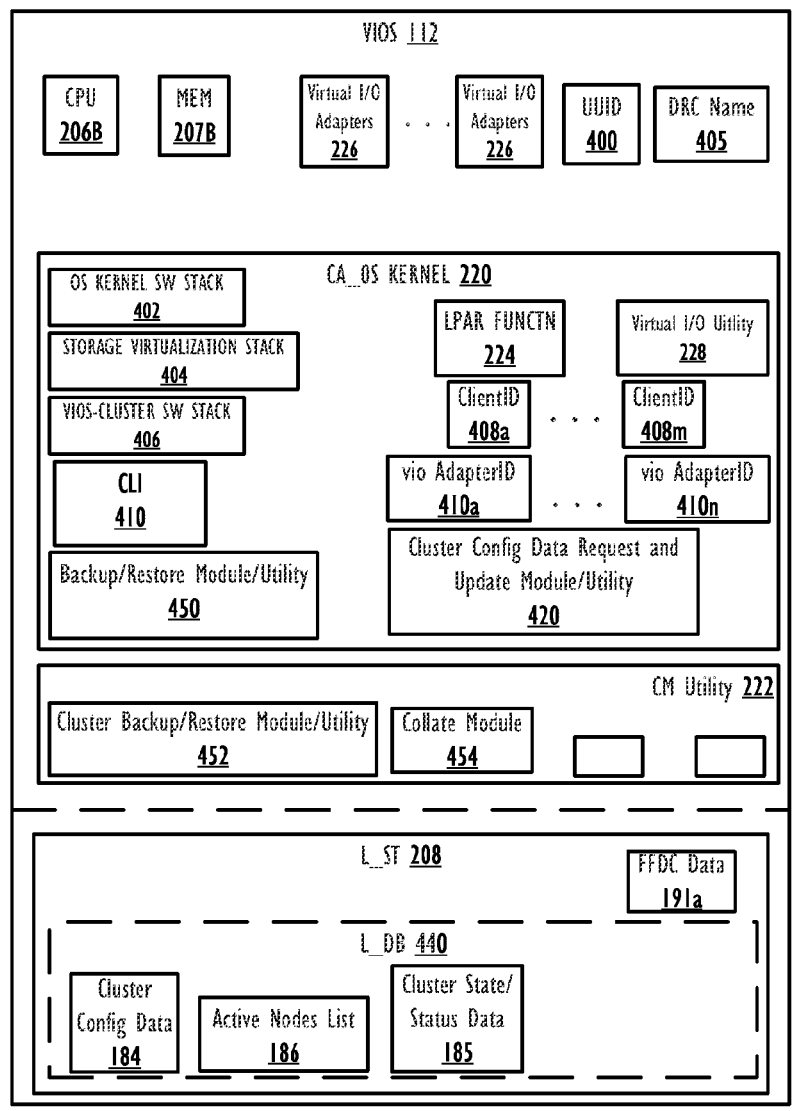
FIG. 4 is an expanded view of an example VIOS with cluster-aware operating system (CA_OS) components and I/O components and component configuration data, according to one or more embodiments.

As described herein, implementation of the cluster awareness with the VIOSes of the cluster enables the VIOSes to provide cluster storage services to virtual clients (114). Thus, VIOS contains L_ST (Local Store or L_Store) 208 within which certain information relative to the local VIOS as well as information related to the cluster are stored. L_ST 208 is a logically carved out portion of actual physical storage of the CEC 110, and is not considered a virtualized structure from that perspective, in one embodiment. Maintained within L_ST 208 is local DB 440. Whenever significant events occur at/to a VIOS within the cluster, the OS 220 (or CM utility 222) updates local OS repository (cache or storage) data entries within local DB 440. According to the described embodiments, VIOS DB 140 and local repository (local DB 440) are utilized to ensure the various nodes (VIOSes) within the VIOS cluster are device level synchronized with each other node in the cluster. As illustrated by FIG. 4 (and expanded by FIG. 5), certain amount of cluster-level data are stored in a local DB 440, which is held within L_Store 234 on each node. In one embodiment, local DB 440 contains configuration data for the devices which exist on that node as well as configuration data relevant for performing a backup of the VIOS DB 140. In one embodiment, this local storage of information enables the processes running on the local node to be able to match the VIOS device with the correct information in either of the distributed, shared databases (140/150).

Returning to the illustrative embodiment of FIG. 2, each client LPAR 114 communicates with VIOS 112 via PHYP 225. VIOS 112 and client LPAR 114A-114B are logically coupled to PHYP 225, which enables/supports communication between both virtualized structures. Each component forwards information to PHYP 225, and PHYP 225 then routes data between the different components in physical memory (233A-233M). In one embodiment, a virtualized interface of I/O adapters is also linked to PHYP 225, such that I/O operations can be communicated between the different logical partitions and one or more local and/or remote I/O devices. As with local I/O routing, data traffic coming in and/or out of I/O adapter interface or network interface from a remote I/O device is passed to the specific VIOS 112 via PHYP 225.

It is appreciated that while various functional aspects of the clustering operations are described as separate components, modules, and/or utility and associated data constructs, the entire grouping of different components/utility/data may be provided by a single executable utility/application, such as CA_OS 220 or CM utility 222. Thus, in one embodiment, CA_OS 220 executes within VIOS 112 and generates a plurality of functional components within VIOS 112 and within DB 140. Several of these functional components are introduced within FIG. 1B, FIG. 2 and FIG. 4, and others are described throughout the various embodiments provided herein. For simplicity in the descriptions which follow, references to CM utility 222 and CA_OS 220 will be assumed to be referring to the same general component (i.e., CM utility 222 being a subcomponent of CA_OS 220), and the terms can be utilized interchangeably throughout the specification.

With the above introduced system configuration of FIGS. 1 (A-C)-4, VIOSes 112 are provided with I/O access to each other, to VIOS cluster DB 140 and to distributed storage repository 150 through one or more virtual adapters (via PHYP 225), and each VIOS is cluster aware. With the cluster aware VIOS infrastructure, different VIOSes 112 associated with different CECs 110 access the distributed storage repository 150 and cluster-level information is shared/communicated across the VIOS cluster (via VIOS DB 140) while each client I/O process is being performed. In this manner the VIOS associated with a first client on a first CEC is aware of which SAN disk resources are being accessed by a second client on a second CEC (or on the same CEC). With this awareness factored into the I/O exchange with the distributed storage repository 150, the VIOS associated with the first client can avoid accessing the same storage resource that is concurrently being utilized by the second client, thus preventing data integrity issues, which could potentially cause data corruption and client partition crashes.

As described herein, a cluster is a set of one or more networked VIOS partitions, where each VIOS within the cluster has access to a common set of physical volumes. The physical volume resides within the VIOS cluster and is utilized to provide block storage. Implementation of the cluster awareness with the VIOSes of the cluster enables the VIOSes to provide cluster storage services to virtual clients (client LPARs 114). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition.

C. VIOS Cluster Communication Protocol and VIOS Communication Architecture

In one embodiment, VIOS functionality is enhanced to enable assigning of client identifiers (ID) and unique virtual I/O adapter IDs in a secure manner, while enabling storage pooling within virtual storage (within distributed storage repository 150). According to the described implementation, the different clientID-vioAdapterID pairings are unique throughout the cluster, so that no two clients throughout the entire cluster can share a same virtual adapter and no two vioAdapterIDs are the same within a single client.

Figure 5A:
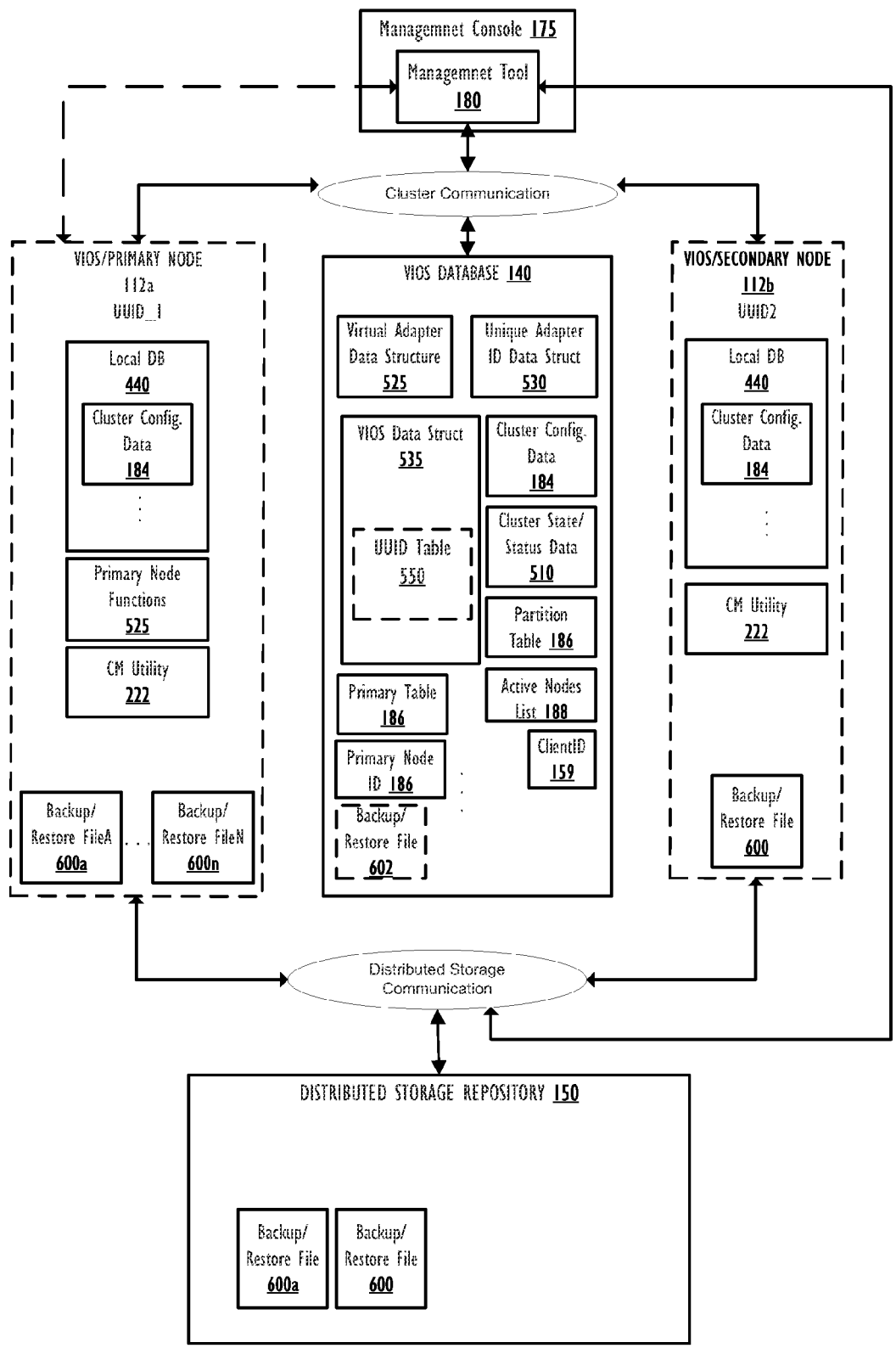
FIG. 5A is a block diagram representation of stored data structures and other functional components within a VIOS cluster database (DB) and within a local VIOS DB storage, according to one or more embodiments.

FIG. 5A is a block diagram representation of functional components of cluster system having a primary node, a secondary node and shared storage (DB 140) to enable cluster level information/data storage, management and exchange between the nodes and VIOS shared storage (DB 140). In one embodiment, a local copy of (relevant cluster level data of) VIOS DB 140 is maintained by each VIOS within the cluster and stored in respective local DB 440. Each VIOS is then responsible for storing, maintaining and updating the data structures at DB 140 in one embodiment. As illustrated by FIG. 5, DB 140 is accessible to the various VIOS nodes 112 and to management tool 405 via cluster communication fabric. Database 140 comprises several different modules of data, which may be arranged in a plurality of formats (e.g., tables, raw data, sequenced data, etc.) According to the figure, DB 140 includes a virtual adapter data structure 525, which maintains a listing of and configuration information about the virtual adapters. In one or more embodiments, VIOS DB 140 also includes a second data structure 530 that holds the unique adapter identifiers (AdapterIDs), and is therefore referred to herein as AdapterID data structure 530. DB 140 maintains a listing of and information about the VIOSes within a VIOS data structure 535. In one or more embodiments, VIOS data structure 535 can include a UUID table 550. UUID table 550 contains a listing of the unique identifier that is associated with each VIOS within the VOS cluster. As provided, each VIOS 112*a*, 112*b* has a different UUID. The UUIDs within UUID table 550 can be utilized to support VIOS recovery, in one or more of the presented embodiments. In one or more embodiments, each of the described data structures 525-535 can be or can include a table within DB 140.

When a virtual adapter is first discovered, the cluster management (CM) utility 122 (FIG. 1B) creates a row within the virtual adapter data structure 525 and a row within the unique AdapterID data structure 530. These two rows in the different data structures are associated with each other, and the identifier (ID) is guaranteed to be unique. In one or more embodiments, adapter names are unique per CEC 110, and where VIOS partitions are not "mobile" (i.e., do not move from a first CEC to a second CEC), the adapter names can be identified using a CEC, name tupple. In one embodiment, VIOS DB 140 can also store information needed to configure a virtual target device (VTD) for a particular client.

When a VIOS 112 is first configured, the VIOS downloads from DB 140 a copy of cluster configuration data 505 and cluster state/status data 510 from VIOS DB 140. Additional data that can be retrieved from DB 140 are partition data 186, active nodes list 188, and client ID data structure 159. In one embodiment, VIOS DB 140 can comprise a copy of VIOS backup/restore file 600 for each VIOS and/or VIOS configuration 191. VIOS DB 140 may comprise a plurality of additional data structures and/or components, some of which are illustrated within VIOS DB 140, but are not germane to the description of the embodiments presented herein.

In one embodiment, DB 140 receives VIOS generated data from each VIOS across the cluster and DB 140 populates its various data structures with the received data. According to one embodiment, VIOS 112 creates a unique identifier (ID) (i.e., a ClientID) for each client that is mapped to the VIOS for I/O processing. The VIOS 112 then stores the unique ClientID in ClientID data structure 159 (FIGS. 1B and 5) within DB 140. The DB 140 and by extension the ClientID data structure 159 are accessible to each VIOS partition in the cooperating cluster (DPS 100). The VIOS 112 also generates an identifier for each virtual IT nexus (virtual I/O AdapterID) that is utilized for each virtual adapter assigned to the client LPAR 114. These vio AdapterIDs are stored in the AdapterID data structure 158 and are associated with their corresponding clientIDs (block 312). With this use of DB 140 to maintain clientID-to-VIO Adapter mappings, each clientID can be associated with a corresponding one or more vio AdapterIDs, and every VIOS within the cluster is aware of the I/O adapter mappings across the entire cluster.

With information about each VIOS device being stored in the DB 140, operations on those devices can be performed from any VIOS node in the cluster, and not just the node on which the device resides. When an operation on a device is performed on a "remote" (non-local) node (i.e. one other than the node where the device physically resides), the operation is able to make any changes to the device's information in the DB 140, as necessary. When corresponding changes are needed in the device's local database, the corresponding CM utility 222 enables the remote node to send a message (using cluster services) to the local node to notify the local node to make the required changes. Additionally, when a node in the cluster is booted up, or when the node rejoins the cluster after having been lost for any period of time, the node will autonomously reference the DB 140 in order to synchronize the data there with the local data of the node.

As an example, if an operation to delete a VIOS device from the local node is executed on a remote node, the operation will remove the information associated with that device from the DB 140, and send a message to the local node to tell the local node to remove the device from the local database. If the local node is down or not currently a part of the cluster, when the local node first boots up or rejoins the cluster, the local node will automatically access the DB 140, retrieve current data/information that indicates that the information for one of the local devices has been removed, and delete that device from the local database records.

In one embodiment, data stored within VIOS DB 140 is accessible to management tool 180 via a cluster communication infrastructure. When backup/restore files 650 and/or cluster backup/restore files 650 are stored at VIOS DB 140, this direct connection of management tool 180 enables management tool 180 to efficiently access all backup/restore file data for each VIOS across the entire VIOS cluster from DB 140. As further presented by FIG. 5A, management tool 180 may also retrieve or access Backup/restore files 600 and/or cluster backup/restore files 650 from distributed storage repository 150. In an alternate embodiment, management tool 180 is provided access to backup/restore file 600 via a direct connection with any one or VIOSes 112 (or specifically a primary node, in one embodiment) within DPS 100. In the illustrative embodiment, management tool 180 has a communication link with VIOS 112*a*, which servers as a primary node for the cluster.

According to one embodiment, the VIOSes that are part of the cluster can query each other to get information regarding the storage and configuration data seen by the other VIOS. Thus, any one of the VIOSes can be queried by the management tool 180 to provide all the information for some other VIOS or for all the nodes within the cluster. The flexibility provided to the management tool further enhances the management tool's performance, as the management tool 180 can obtain all the data by querying just a single node, instead of having to query each node in the cluster, in sequence.

Figure 5B:
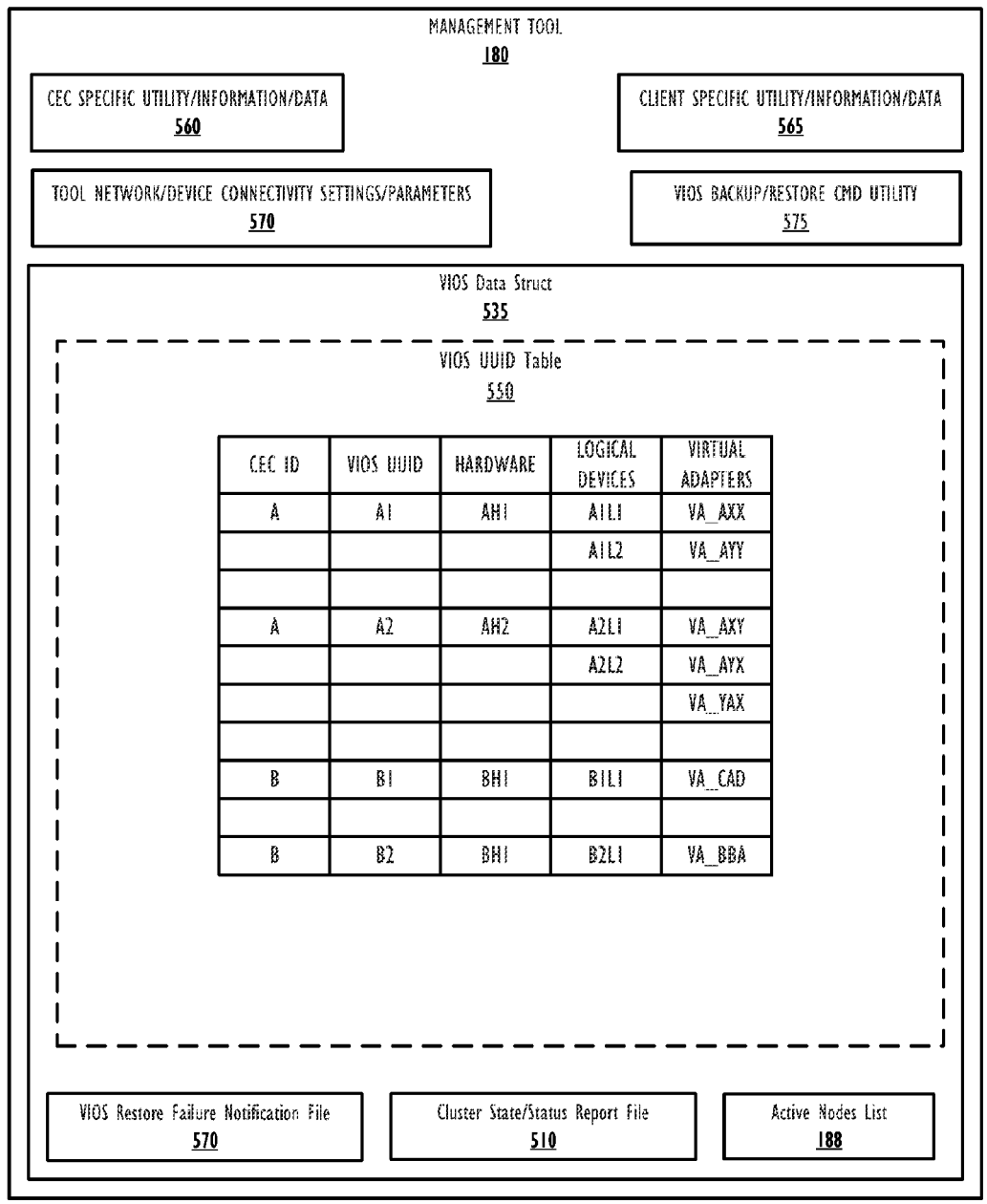
FIG. 5B is a block diagram illustrating component parts of a management console and a UUID table, according to one or more embodiments.

Referring now to FIG. 5B, there is illustrated a component view of management tool 180, according to one embodiment. It is appreciated that the components can be a combination of software, data structures and/or functional code that executes on a processing device of management console 175. Further, management console 175 comprises one or more I/O devices that enable a system administrator to access the functional features of management tool. 180. In one embodiment, management tool 180 can connect to one or more VIOSes within a VIOS cluster via the application programming interface (API) of the respective VIOS. Connection to the API is enabled via the virtualization management component (e.g., pHYP) 225 (FIG. 2) in one embodiment. In yet another embodiment, management tool 180 may register with a primary node to receive specific information about the VIOS cluster, including information from local DB 440 or VIOS DB 140. Among the software modules and data structures within management tool are CEC specific utility/information/data 560 and client LPAR specific utility/information/data 565, which respectively provides management tool 180 with information about the CEC and the client LPARs at the CEC, as well as other data and functions at the CEC level and at the client LPAR level. Management tool 180 also comprises network and device connectivity settings and parameters 570. In the illustrative embodiment, management tool 180 has a VIOS backup/restore command utility 575 by which the management tool enables a system administrator (on management console) to access the OS of a VIOS and enter VIOS backup/restore (VBR) commands and VBR command parameters. Management tool 180 also includes several VIOS data structures 535 including cluster state/status report file 510, active nodes list 188 and VIOS restore failure notification file 570. Management tool 180 further comprises VIOS UUID data structure 550 (illustrated as a table for simplicity) within which a list of the unique identifiers of the individual VIOSes within the VIOS cluster is maintained. As presented by the VIOS UUID table 550, each CEC has a corresponding CEC ID, and each VIOS within each CEC has a UUID, which is unique both at the CEC and throughout the entire VIOS cluster. UUID Table 550 also provides identifying parameters associated with each VIOS, including identifying information about the hardware, logical devices and virtual devices of the respective VIOS. According to one or more embodiments, the virtual devices (e.g., virtual adapters) are also unique relative to each other at one or more of a client level, a VIOS level, a CEC level and a VIOS cluster level. As described below, these unique IDs (UUID and Virtual adapter IDs) within the UUID table 550 of management tool 180 allow for completion of a disaster recovery type scenario of a failed VIOS, where the DRC name provided within the VIOS configuration backup file does not match the DRC name of the VIOS in which the configuration backup file is being utilized to perform a restore operation.

D. VIOS Restore Operations when DRC does not Match

According to one or more embodiments, various functional features of the CA_OS can be established to allow for efficient backup and subsequent restore of configuration data at the individual VIOS level. Aspects of the described embodiments involve a system administrator accessing the CA_OS of a particular VIOS and setting the backup parameters to enable the backup module to back up the local VIOS and/or restore the local VIOS. The restoration of the VIOS may be initiated in response to a failure of the VIOS, in a disaster recovery situation, during a migration of a particular VIOS, or re-installation of a failed/defunct VIOS on the same or a different CEC. The described embodiments enable system administrators to trigger execution of local VIOS backup and restore operations (presented in Section D1) and perform VIOS restore when DRC name mismatch occurs (presented in Section D2). In one or more embodiments, access by the system administrator is provided via management tool 180 executing within management console 180, which is communicatively connected to the CEC and/or more specifically to one or more OSes of the VIOSes 112. In one embodiment, such system administrative access is via a command line interface (CLI) to the OS.

The below described embodiments are implemented within the various configurations of DPS 100 (FIGS. 1-2) having VIOSes 112 of one or more CECs 110 arranged in a VIOS cluster and supporting the I/O operations of the client LPARs located on the one or more CECs 110. As provided herein, the VIOSes are cluster aware and share cluster-level data via VIOS DB 140. Further, the VIOSes 112 provide the VIO operations that enable access to distributed storage repository 150. The various presented embodiments further provide application of management tool (180) functionality and descriptions of the methods and processes that collectively enable VIOS restore in conditions where the DRC name of the configuration backup file does not match the DRC name of the VIOS in which the restore operation is being performed. These embodiments are supported/provided by additional functionalities of (i.e., encoded within) the CA_OS 220 and/or CM utility 222 (which may include a specific VIOS backup/restore (VBR) utility).

Figure 6:
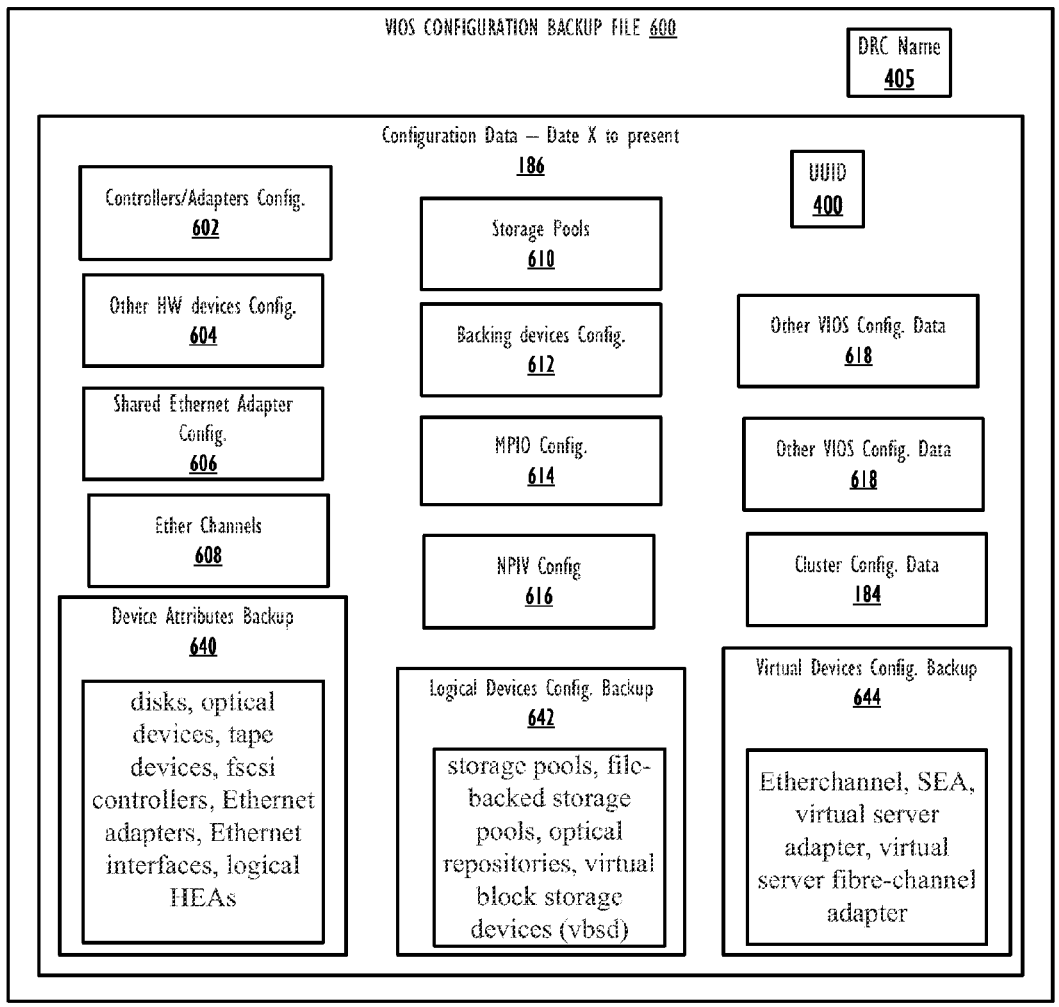
FIG. 6 is a block diagram representation of example data within a VIOS backup file, according to various embodiments.
Figure 7:
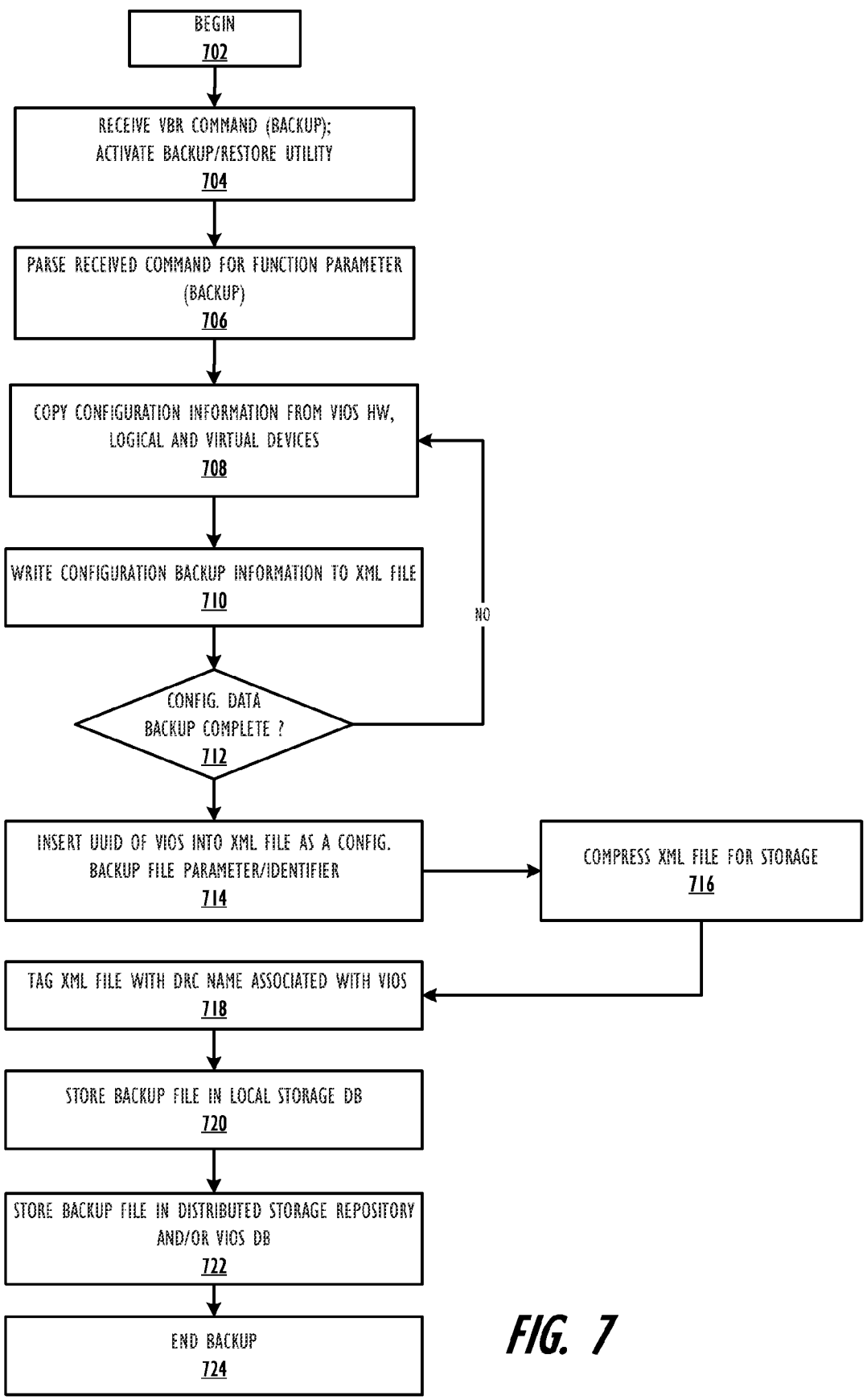
FIG. 7 is a high-level logical flowchart illustrating an example method by which a VIOS backup operation occurs within the CA_OS environment, according to one or more embodiments.
Figure 8:
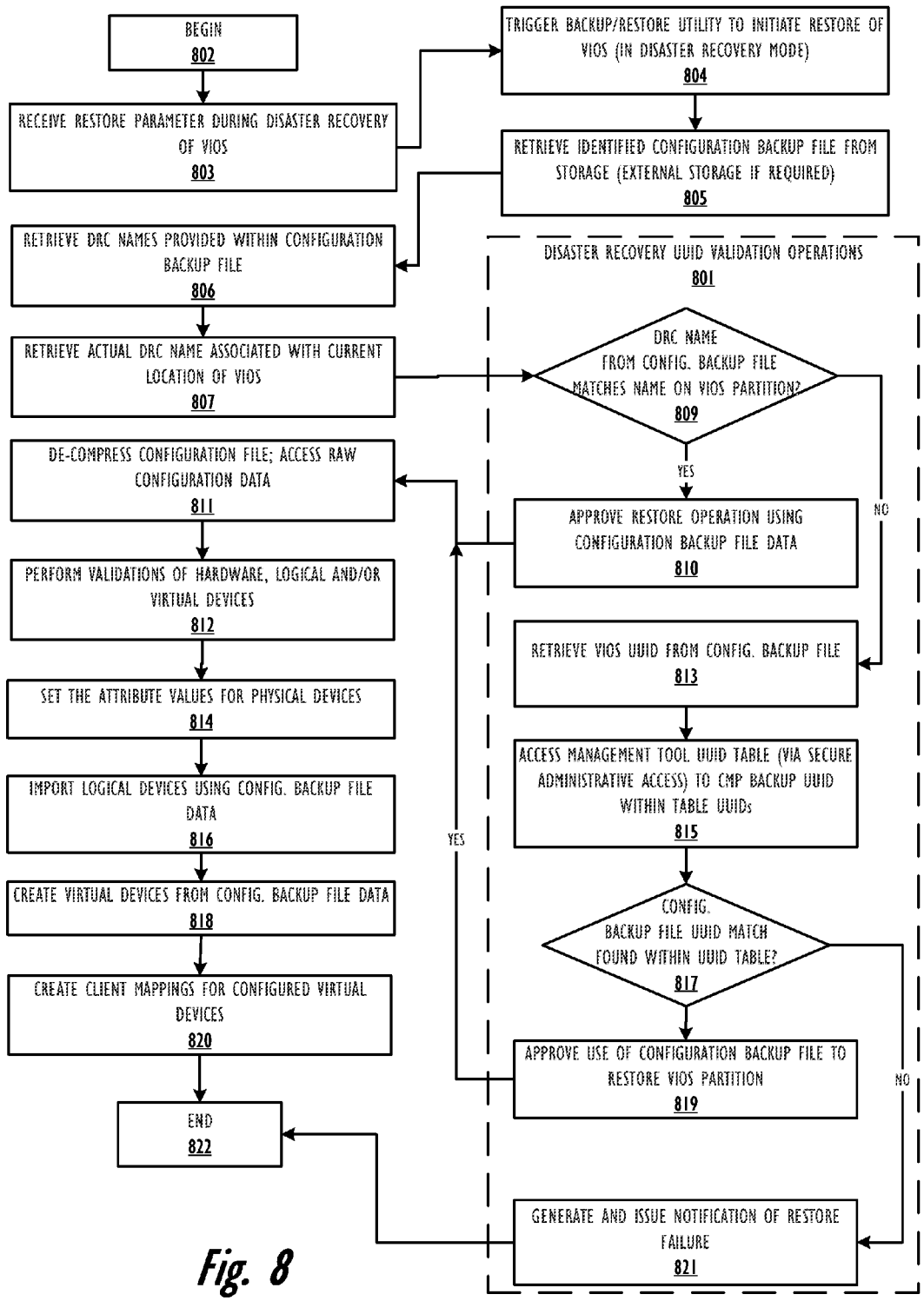
FIG. 8 is a high-level logical flowchart of an example method by which a VIOS restore operation is completed for a VIOS, utilizing a management tool, when the DRC name of the VIOS partition does not match the DRC name found within the VIOS configuration backup file, according to one or more embodiments.

The flow charts of FIGS. 7-8 illustrate embodiments of various methods by which the above introduced processes of specific embodiments are completed. Although the methods illustrated by FIGS. 7 and 8 may be described with reference to components and functionality illustrated by and described in reference to FIGS. 1-6, it should be understood that this is merely for convenience and alternative components and/or configurations thereof can be employed when implementing the various methods. Certain portions of the methods may be completed by functional components/modules of CA_OS 220 and/or CM utility 222 (e.g., backup/restore utility 450) executing on one or more (virtual) processors (CPU 206A) within VIOS 112 (FIGS. 1 or 2). The executed processes then control specific operations of or on CECs 110, VIOSes 112, and DB 140 (and distributed storage repository 150, in some embodiments).

It is further appreciated that within the description, the various ones of the backup and restore functionalities can be described as being provided by a specific backup/restore utility 450 (FIG. 4) of the CA_OS 220 or the CM utility 222. For simplicity in describing the methods and the embodiments in general, all method processes are described from the perspective of a single backup/restore utility 450 and/or components/modules within CA_OS 220 operating within a CA_VIOS 112 of a VIOS cluster.

D1. Backup of VIOS Partition with Initial DRC Name and UUID

Specific descriptions of the operation and/or functionality of the backup/restore utility 450 are presented with reference to the block representation of configuration backup files of FIG. 6, the management tool 180 of FIG. 5, and the flow charts of FIGS. 7 and 8. Turning now to FIG. 6, there is illustrated a block diagram representation of the various types of configuration data that are copied into an example VIOS configuration backup file 600. The specific components within VIOS configuration backup file 600 will be introduced in the following description, which is also presented with reference to the example method, illustrated by FIG. 7, of performing a backup operation, according to one embodiment.

Generally, the backup/restore utility 450 automates the backup and restoration of virtual and logical device configurations on a VIOS partition. According to one embodiment, the backup/restore utility 450 performs a backup of all the hardware, logical and virtual devices on the VIOS partition and stores the configuration backup data into an extensible markup language (XML) file (VIOS backup 650). In one or more embodiment, the backup/restore utility 450 also includes the functionality to allow the user to view the various virtual and logical device configurations. In an extension of each of these embodiments, the backup/restore utility 450 also comprises the functionality to restore these configurations later on the same OS partition. This automation of the restore task via the backup/restore utility 450 provides the following advantages, among others: (a) correctness in the configuration backup data in that the utility ensures that all the available backed-up devices are restored to the same state when the backup was taken; (b) efficiency in completing the restore compared to over a manual (e.g., via an system administrator) restore; (c) inexpensiveness, as only the VIOS configuration data is backed-up and the full partition data does not need to be backed up; and (d) expandability, whereby the techniques provided by the backup/restore utility 450 can easily be enhanced to support any new hardware, virtual or logical devices.

According to one or more embodiments and as illustrated by FIG. 6, the various VIOS configuration data that are backed up into the backup (XML) file 600 comprise controllers/adapters 602 and other hardware devices 604, Shared Ethernet Adapters 606, Ether Channels 608, Storage pools 610, backing devices 612, multipath I/O (MPIO) configurations 614, N_Port ID Virtualization (NPIV) 616, and other VIOS configuration data 618. Accordingly, the backup/restore utility 450 does not capture information/data on the client LPAR 114 or hosted partitions, but only the configurations on the VIOS 112. All other client-level backup can be performed via standard OS backup features, which backs up the specific client application data and states. In addition to the configuration data of the hardware, logical and virtual devices configuration data 186 comprises UUID 400. Further, the configuration backup file 600 is tagged with the DRC name associated with the VIOS partition to enable efficient recognition of the backup file as belonging to the particular VIOS partition (during a subsequent restore operation). In normal restore conditions, the VIOS configuration backup file 600 is restored within a same client LPAR having the same DRC. However, according to one or more embodiments, in situations where there is a VIOS crash/failure condition (e.g., a condition that leads to corruption of the rootvg file), or a hardware failure preventing use of the particular VIOS identified by the associated DRC name, the backup/restore utility 450 provides the functionality to reinstall the earlier backed up data of the VIOS (i.e., restore the data from an earlier completed data backup of VIOS or other OS partition) within a different VIOS structure (having a different DRC name) and then replay the configuration of the original VIOS from the configuration backup (XML) file 600.

According to one embodiment, the various functions of the backup/restore utility 450 can be triggered from the management console 175 via input of a specific backup/restore command, which is received by the backup/restore utility 450 (block 704) following initiation of the process (block 702). This input may be within a user interface or a command line interface depending on the design and/or implementation of the management tool 180. In the various embodiments, the VIOS backup/restore (VBR) command handles/implements/triggers the backup/restore utility 450 to perform the functions/operations of (a) backing up virtual & logical configuration, (b) listing the configurations within an output space and (c) restoring the configurations of the specific VIOS, including in situations where the DRC name of the VIOS does not match that of the configuration backup file. In one or more embodiments, these various functional features are triggered by specific ones of a plurality of parameters that can be associated with the backup/restore command. For example, in one implementation, VBR command can take the following parameters: (a) backup, which initiates the backup process; (b) view, which lists the various configuration data within the specified backup file; and (c) restore, which performs the restore operation for the particular VIOS linked to the target backup file. The implementation of the backup features and the restore features are now described in greater detail by the methods of FIGS. 7 and 8, respectively.

In the method of FIG. 7, following receipt of the command, the backup/restore utility 450 parses the command for is associated parameter and parses the received command (block 705) for a specific function parameter that indicates which of the three functions of the utility has been activated. According to the embodiments, when, as determined at block 706 the command is to perform a backup operation, the VBR command is implemented with the backup parameter while targeting a first VIOS. The backup/restore utility 450 of the VIOS is triggered to perform the backup function on the first VIOS. With these embodiments, receipt of the backup feature with the VBR command, (as determined at blocks 705/706) triggers the backup/restore utility 450 to back up (i.e., capture a current copy of) all the device properties and virtual devices configurations on the first VIOS (block 708). In one more embodiments, the configuration information that is copied into the backup file includes devices attributes information 640, logical devices information 642 and virtual devices information 644. In one embodiment, the device attributes information 640 comprise device attributes for disks, optical devices, tape devices, fscsi controllers, Ethernet adapters, Ethernet interfaces, logical host Ethernet adapters (HEAs). In one embodiment, the logical devices information 642 comprises information about storage pools, file-backed storage pools, optical repositories, virtual block storage devices (vbsd). In one embodiment, the virtual devices information 644 comprises information on devices such as Etherchannel, SEA, virtual server adapter, and virtual server fibre-channel adapter. The VBR command (backup) can be provided additional variables that trigger the backup/restore utility 450 to run (perform the backup operation) once or more than once at a stipulated period of time along with a 'frequency' parameter, such as but not limited to daily, weekly, or monthly. For example, the command may trigger the backup/restore utility 450 to perform daily backups at 00:01 hrs.

In one embodiment, an additional parameter can be specified with the VBR command to enable the user (e.g., administrator) to specify the number of backup files that can be saved for a single backup target (VIOS). Thus, for example, the parameter may be set to 10, which then enables backup/restore utility 450 to save the last 10 copies of the configuration files backed up. This storage can be within local storage 208 or on the distributed storage repository 150. With this embodiment, the backup/restore utility 450 also comprises a mechanism by which an oldest stored backup file is automatically removed from the list of backup files in response to the list being at a maximum capacity and a new backup is triggered for completion. According to the various embodiments, the configurations backup data/information are written into an XML file (block 710). Once the backup of the configuration data is completed, as determined at block 712, the backup/restore utility 450 inserts the UUID of the VIOS into the XML file, as one of the configuration backup parameters (block 714). The insertion of the UUID can be simply to provide a unique identifier to the backup file that matches the file to the specific VIOS instance. The backup/restore utility 450 then compresses The XML file for storage and the compressed filed includes the particular VIOS UUID, which can be utilized during a later restore process (block 716). The backup/restore utility 450 tags the XML file with the DRC name associated with the VIOS (block 718). This initial DRC name represents the specific location within the specific CEC at which the VIOS is currently implemented. The backup file, tagged with the DRC name (and backup file version number), is stored in the local DB 440 (block 720), and a copy can be forwarded to distributed storage repository 150 or VIOS DB 140 (block 722). A default storage location within distributed storage repository 150 or within local store 208 is provided to backup/restore utility 450. However, alternate embodiments enable the user/administrator to specific a location for storage of the generated backup files. The backup process then terminates at end block 724.

D2. Validation and Restore of VIOS Partition with DRC Name Mismatch

FIG. 8 illustrates some of the features related to the method for performing a restore of a VIOS backup file, according to one or more embodiment. In these embodiments, the backup/restore utility 140 takes an earlier backup file as input and performs one or more processes to bring the VIOS partition to the same state as the existing state when the backup was originally taken. According to the embodiments, when the VBR command is implemented with the restore parameter while targeting a first VIOS, the backup/restore utility 450 of the first VIOS is triggered to perform the restore function using the backup file corresponding to the selected VIOS (or vice versa, where the backup file is the target of the command). With these embodiments, following initiation of the method (block 802), the VIOS OS receives the restore command with a restore parameter that may indicate that the restore is being completed following a disaster recovery scenario (block 803). The CA_OS triggers the backup/restore utility 450 (block 804), which retrieves an earlier configuration backup file from storage (block 805). The backup/restore utility 450 retrieves the initial DRC name from the configuration backup file (block 806) and obtains a copy of the DRC name associated with the current VIOS location (block 807). The backup/restore utility 450 compares the initial DRC name with the current DRC name to determine (block 809) whether the two DRC values match. Matching DRC names indicates that the configuration files are being restored within the same original VIOS location and provides a first level of security for client LPARs that perform I/O operations via the particular VIOS. When the DRC names match, the backup/restore utility 450 approves the continuation of the restore operation using the configuration data from the retrieved backup file (block 810).

However, when the DRC names do not match (i.e., a DRC mismatch condition occurs), the backup/restore utility 450 triggers the OS to attempt to retrieve the stored VIOS UUID from the configuration backup file (block 813). The OS communicates with and accesses the UUID table 550 within management tool 180 (block 815). While not specifically shown in the figure, the backup/restore utility 450 and/or the management tool (which has administrative access) can retrieve the UUID from the configuration backup file. The backup/restore utility 450 or the management tool 180 would perform a de-compression of the configuration backup file to gain access to stored UUID. With the stored UUID from the configuration file retrieved, one of the management tool 180 or the CA_OS 220 performs a comparison of the UUID from the configuration data file with the UUID found within the UUID mapping table 550. When a match of the UUID at the specific CEC is not found within the UUID table 550, an error message notification is generated and failure of the restore operation is notified via an appropriate output mechanism (e.g., displayed on an administrative screen or emailed to an administrator) (block 821). However, when the UUID fro the configuration data file is found within the UUID table with correct location information (assigned CEC, etc), the backup/restore utility 450 is notified of an approval to continue utilizing the retrieved configuration backup file (with inoccrect DRC name) to perform the backup. The backup/restore utility then decompresses the configuration file (if not already decompressed within the VIOS during the UUID checking process) to access the raw configuration data stored within the configuration file (block 811). The backup/restore utility 450 performs the various secondary validations required for the hardware, logical and virtual devices in order to complete the backup operation for those devices (block 812). In one embodiment, once the files are decompresses and the information is available, the backup/restore utility 450 performs a series of validation checks. These checks include a hardware validation check, which if passed, allows the backup/restore utility 450 to proceed with a virtual device validation check, which may be performed for multiple different virtual devices. If either of these two validation checks fails, the backup/restore utility 450 terminates the restore operation and marks the operation as failed. The backup/restore utility 450 would then generate and issue a notification of the failure, similar to the failure notification of block 821, but specifying the specific type of failure encountered during the restore process, in one embodiment. Several of the specific hardware and virtual device validation checks are described below. When the various checks performed pass, the backup/restore utility 450 is able to complete the configuration restore process of the VIOS. Thus, utilizing the information provided within the configuration data file, the backup/restore utility 450 performs the functions of setting the attribute values for physical devices (block 814), importing logical devices (block 816), and creating virtual devices (block 818) and corresponding mappings of the virtual devices to specific clients (block 820). The method process then terminates at end block 822.

In one or more embodiments, the attributes can be set for controllers, adapters, disks, optical devices, tape devices, and/or Ethernet interfaces. In one embodiment, the logical devices that can be imported include volume groups/storage pools, LVs, filesystems and repositories. Also, in one embodiment, among the virtual devices that can be created are etherchannel, shared Ethernet adapter, and virtual target devices. Additionally, in one or more embodiments, the backup/restore utility 450 performs the functions of creating mappings between virtual scsi server adapters-VTD-backing devices, vfc server adapter-fc adapter and vrmpage-backing devices.

In one embodiment, execution of the VBR command with the restore option needs to be run on the same VIOS partition from which the backup file was taken. The VBR command can also be provided with parameter values to trigger the backup/restore utility 450 to perform validation of the devices on system, restoring of a category of devices, and performing the restore operation interactively.

According to one embodiment, the backup/restore utility 450 performs the restore operation in multiple phases, which includes a hardware validation phase and a virtual device configuration validation phase. In the described embodiments, the backup/restore utility 450 performs the hardware validation first and then follows the hardware validation with the virtual device configuration validation. While the two validation phases are each generally presented by two blocks, a more detailed description of several of the various different considerations required for each phase are described below. The general presentation in the figures is solely for illustration.

According to one embodiment, during the hardware validation process, the backup/restore utility 450 compares the Fibre Channel Adapter and Fibre Channel Controller attributes saved in the backup XML file with those attributes that exist on VIOS (block 852). The backup/restore utility 450 determines (block 854) if there is any mismatch between the backup attributes and the VIOS attributes. In response to the attributes being the same on both the backup file and on the VIOS, the backup/restore utility 450 changes the attributes to the ones from the backup file (856). Otherwise, where the backup/restore utility 450 determines that the attributes are not the same (e.g., the backup command fails), the backup/restore utility 450 updates a lists containing attributes that are not changed (block 858). In one embodiment, a registered failure of the comparison operation on any of the hardware devices in phase causes the backup/restore utility 450 to generate a warning message that is relayed back to the management console. During an interactive restore operation, the backup/restore utility 450 provides the user with a choice of whether or not to continue along with the restore operation, and the warning message indicates the point of failure in the process.

One embodiment provides for a backup of SCSI, SAS, ISCSI, Optical and Tape controllers. In one example, tape devices, optical devices, physical adapters and logical Host Ethernet Adapters can be compared and validated. The order of such comparison and validation follows the presentation order for each of these types of devices.

For the second phase of the restore operation, which provides a validation of virtual and logical device configurations, the backup/restore utility 450 requires that all VIOS entities in the backed up XML file should be validated before identifying the entity as actionable items for deployment. For this process, a level of validation needs to be decided, and the backup/restore utility 450 performs one or more of the following validations:

(a) SEA validation, whereby a check is made whether the physical adapter location code in the xml matches any of the location codes on the VIOS system. The embodiment requires each of the following conditions: (1) that the physical adapter location code exist and be available; (2) that the adapter location codes used for the Etherchannel exist and be available; (3) that the virtual adapter location codes be the same. Then, once these values check out to be accurate, and in response to the target adapter, virtual Ethernet adapters and control channel adapters being available, the backup/restore utility 450 determines that identifies the SEA as an actionable item and deploys the SEA. If any of the virtual adapters or the target physical adapter are already being used, the backup/restore utility 450 will mark the SEA as not being deployable. Where the SEA has an interface configured, all the attributes of the interface will be validated. If the physical adapter for the SEA already has Internet Protocol (IP) configured on the physical adapter, the backup/restore utility 450 migrates the IP to the SEA, if needed.

(b) Etherchannel validation requires that the physical adapters location codes should be same. If all the target adapters match and are available, the backup/restore utility 450 identifies the Etherchannel as an actionable item and will deploy the Etherchannel. However, in response to any of the target adapters being already used by another device, then the backup/restore utility 450 identifies the Etherchannel as not deployable.

(c) SP validation requires that the disks should be same. The backup/restore utility 450 ensures that the disks are the same by validating the UDID of the disks. According to one or more embodiments, the UDID can be either a "unique_id" or "ieee_vol_name" or "pvid". Additionally, for SP validation, the disks should be available. That is, the disks cannot be assigned to any clients and should not be a part of any other SP, in one embodiment. Further, the SP name should be the same and the default SP characteristic should be same. In the event that a name already exists and if all of the disks match, the backup/restore utility 450 identifies the SP as already deployed. In response to the conditions that the all disks are free and the SP name is not in use, then the backup/restore utility 450 identifies the SP as an actionable item and the backup/restore utility 450 deploys the SP.

(d) To complete validation of a VTD, the type of VTD is required in making the evaluation. If the VTD is SP-based, the SP name should be the same and the VTD size should be same (between the XML file and the current version on the VIOS). Also, the vSCSI server adapter slot should be same. However, if the VTD is PV-based, then the disk should be same and the vSCSI server adapter slot should be same. For lvbased devices, file backed devices, optical devices or tape backing devices, the backing device name as well as the parent SP should be validated.

In one embodiment, in which a FBSP or optical repository is to be restored, the backup/restore utility 450 requires that the FBSP name should be same and that the parent SP should be same. In the event that the name of the FBSP/optical repository matches and the parent SP also matches, then the backup/restore utility 450 identifies the FBSP/optical repository as already deployed. However, in situations when the FBSP does not exist and the parent SP exists, then the backup/restore utility 450 creates the fbsp. Finally, in the even that the FBSP name matches, but the parent SP does not match, then backup/restore utility 450 cannot deploy the FBSP.

Thus, as described herein the various embodiments provide a method, data processing system and computer program product that enables backup and restore functionality for configuration data of a VIOS when the DRC name associated with the VIOS configuration backup file does not match the DRC name currently associated with the VIOS that is performing the restore operation. The method comprises the following functional features:

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a data processing system having a processor, a memory coupled to the processor, at least one input/output (I/O) adapter that enables connection to an external network with a shared storage repository, and a virtualization management component executing within the data processing system to generate a plurality of operating system (OS) partitions including a first virtual I/O server (VIOS) partition of multiple VIOS partitions communicatively coupled to create a VIOS cluster, a method comprising:
   responsive to receipt of a VIOS restore command at a first VIOS within the VIOS cluster:
      retrieving the configuration backup file from a local storage;
      comparing a DRC (Dynamic Reconfiguration connector) name retrieved from the retrieved configuration backup file with a current DRC name associated with the VIOS partition in which the OS instance is executing; and
      in response to determination of a DRC name mismatch:
         retrieving an initial UUID (Universal Unique Identification) of the VIOS from within the configuration backup file;
         accessing a UUID table within a management tool;
         locating a matching UUID to the initial UUID within the UUID table; and
         in response to locating the matching UUID:
            verifying that the configuration data file belongs to the VIOS in which the restore operation is being initiated; and
            performing the restore operation, wherein the restore operation includes restoring the configuration of the hardware, logical and virtual devices of the first VIOS to a state that existed at a time at which a backup operation that created the configuration backup file was performed, wherein the performing the backup operation on the first VIOS partition comprises:
               copying the configuration information for each device whose configuration information is required for the configuration backup file; writing the configuration information and the initial UUID into a single extensible markup language (XML) file; performing a zip operation to compress the single file; and
               storing the single file as the configuration backup file, tagged with at least the DRC name as an identifier of the configuration backup file.

2. The method of claim 1, further comprising generating a failure notification when no matching UUID is found within the UUID table.

3. The method of claim 1, further comprising:
   performing, via a backup/restore utility of a cluster aware (CA) operating system (OS) executing on a processor resource of the first VIOS partition, a backup operation on the first VIOS partition, which creates a configuration backup file having configuration information about the hardware, logical and virtual devices of the VIOS partition;
   associating with the backup file a UUID of the OS instance within the first VIOS partition for which the backup file is being created;
   tagging the configuration backup file with a DRC name identifying a current network location of the first VIOS partition;
   storing the configuration backup file within local storage.

4. The method of claim 1, further comprising:
   receiving a first trigger at the CA OS that is associated with performing one or more of a backup and a restore operation; and
   in response to the first trigger being a received virtual backup/restore (VBR) command:
      parsing the received VBR command for a function parameter that indicates which operation is being requested and a feature parameter that identifies whether one or more specific features are associated with the operation to be performed; and
      performing the requested operation, wherein the requested operation is performed with one or more specific features identified by the feature parameter in response to the feature parameter containing the one or more specific features.

5. The method of claim 1, wherein said restoring further comprises:
   performing one or more validation checks of one or more of the hardware, logical and virtual devices against the stored parameters within the configuration backup file; and
   in response to a validation check of one or more of the validation checks failing:
      pausing a restore operation; and
      generating a notification of an error in the restore operation.

6. The method of claim 1, wherein the storing of the configuration backup file comprises one or more of:
storing a local copy of the configuration backup file at a local storage of the VIOS; and
storing an exportable copy of the configuration backup file at one or more of a shared storage repository and a VIOS database.

7. The method of claim 1, wherein the restore operation is performed following a disaster affecting the first VIOS and the restore command includes a parameter to enable a restore utility of the first VIOS to access the management console in response to the occurrence of a DRC name mismatch.

8. The method of claim 1, wherein the VIOS is located at one of a different network address and a different physical machine from an original location associated with the original DRC name.

9. The method of claim 2, wherein the VBR command is received via a command line input from a management console communicatively connected to the first VIOS.

10. The method of claim 2, further comprising, in response to the first trigger being a restore request received at the OS via an external input as a VBR command:
retrieving the configuration backup file from storage;
unzipping the configuration backup file; and
performing the restoring of the configuration of the hardware, logical and virtual devices of the first VIOS.

11. A data processing system comprising:
one or more processors;
one or more memories coupled to the one or more processors;
at least one input/output (I/O) adapter that enables connection to an external network with a shared storage repository; and
a virtualization management component executing within the data processing system to generate a plurality of operating system (OS) partitions including a first virtual I/O server (VIOS) partition having a VIOS backup/restore (VBR) utility executing thereon and which performs the functions of:
responsive to receipt of a VIOS restore command:
retrieving the configuration backup file from one of a local storage and a VIOS database;
comparing a DRC (Dynamic Reconfiguration connector) name retrieved from the retrieved configuration backup file with a current DRC name associated with the VIOS partition in which the OS instance is executing; and
in response to detection of a DRC name mismatch:
retrieving an initial UUID (Universal Unique Identification) of the VIOS from within the configuration backup file;
accessing a UUID table within a management tool;
locating a matching UUID to the initial UUID within the UUID table; and
in response to locating the matching UUID:
verifying that the configuration data file belongs to the VIOS in which the restore operation is being initiated; and
performing the restore operation, wherein the restore operation includes restoring the configuration of the hardware, logical and virtual devices of the first VIOS to a state that existed at a time at which a backup operation that created the configuration backup file was performed, wherein the performing the backup operation on the first VIOS partition comprises:
copying the configuration information for each device whose configuration information is required for the configuration backup file;
writing the configuration information and the initial UUID into a single extensible markup language (XML) file;
performing a zip operation to compress the single file; and
storing the single file as the configuration backup file, tagged with at least the DRC name as an identifier of the configuration backup file, wherein the storing of the configuration backup file comprises one or more of:
storing a local copy of the configuration backup file at a local storage of the VIOS; and
storing an exportable copy of the configuration backup file at one or more of a shared storage repository and a VIOS database.

12. The data processing system of claim 11, the VBR utility performing the functions of generating a failure notification when no matching UUID is found within the UUID table.

13. The data processing system of claim 11, the VBR utility further performing the functions of:
performing, via a backup/restore utility of a cluster aware (CA) operating system (OS) executing on a processor resource of the first VIOS partition, a backup operation on the first VIOS partition, which creates a configuration backup file having configuration information about the hardware, logical and virtual devices of the VIOS partition;
associating with the backup file a UUID of the OS instance within the first VIOS partition for which the backup file is being created;
tagging the configuration backup file with a DRC name identifying a current network location of the first VIOS partition;
storing the configuration backup file within local storage.

14. The data processing system of claim 11, the VBR utility further performing the functions of:
receiving a first trigger at the CA OS that is associated with performing one or more of a backup and a restore operation; and
in response to the first trigger being a received virtual backup/restore (VBR) command:
parsing the received VBR command for a function parameter that indicates which operation is being requested and a feature parameter that identifies whether one or more specific features are associated with the operation to be performed; and
performing the requested operation, wherein the requested operation is performed with one or more specific features identified by the feature parameter in response to the feature parameter containing the one or more specific features.

15. The data processing system of claim 11, wherein said restoring further comprises:
performing one or more validation checks of one or more of the hardware, logical and virtual devices against the stored parameters within the configuration backup file; and
in response to a validation check of one or more of the validation checks failing:
pausing a restore operation; and
generating a notification of an error in the restore operation.

16. The data processing system of claim 11, wherein:
the restore operation is performed following a disaster affecting the VIOS; and
the restore command includes a parameter to enable the restore utility of the VIOS to access the management console in response to the occurrence of a DRC name mismatch; and
wherein the VIOS is located at one of a different network address and a different physical machine from an original location associated with the original DRC name.

17. The data processing system of claim 12, wherein the VBR command is received via a command line input from a management console communicatively connected to the first VIOS.

18. The data processing system of claim 12, wherein in response to the first trigger being a restore request received at the OS via an external input as a VBR command, the VBR utility further performs the functions of:
retrieving the configuration backup file from storage;
unzipping the configuration backup file; and
performing the restoring of the configuration of the hardware, logical and virtual devices of the first VIOS.

* * * * *